United States Patent
Hoefken

(10) Patent No.: US 10,927,932 B2
(45) Date of Patent: Feb. 23, 2021

(54) AXIAL CAM GEARBOX MECHANISM

(71) Applicant: Motus Labs, LLC, Dallas, TX (US)

(72) Inventor: Carlos A. Hoefken, Dallas, TX (US)

(73) Assignee: MOTUS LABS, LLC, Dallas, TX (US)

( * ) Notice: Subject to any disclaimer, the term of this patent is extended or adjusted under 35 U.S.C. 154(b) by 0 days.

(21) Appl. No.: 16/818,738

(22) Filed: Mar. 13, 2020

(65) Prior Publication Data

US 2020/0208720 A1 Jul. 2, 2020

Related U.S. Application Data

(63) Continuation of application No. 16/537,218, filed on Aug. 9, 2019, now Pat. No. 10,626,964, which is a continuation-in-part of application No. 16/194,053, filed on Nov. 16, 2018, now Pat. No. 10,428,916, which is a continuation-in-part of application No. 14/995,094, filed on Jan. 13, 2016, now Pat. No. 10,260,606, which is a continuation of application No. 13/795,488, filed on Mar. 12, 2013, now Pat. No.
(Continued)

(51) Int. Cl.
  *F16H 25/06* (2006.01)
(52) U.S. Cl.
  CPC ........ *F16H 25/06* (2013.01); *Y10T 74/18296* (2015.01)
(58) Field of Classification Search
  CPC .......... F16H 25/06; F16H 25/00; F16H 25/04; F16H 25/10
  See application file for complete search history.

(56) References Cited

U.S. PATENT DOCUMENTS

| 1,666,458 A | 4/1928 | Leland |
| 2,049,122 A * | 7/1936 | Kuba ...................... F16H 25/06 74/63 |

(Continued)

FOREIGN PATENT DOCUMENTS

CN 102121511 B 7/2011

OTHER PUBLICATIONS

Schwartz et al, "Making the Right Shaft Connections," MachineDesign, Aug. 1, 2000, pp. 1-26, online document.

*Primary Examiner* — David M Fenstermacher
(74) *Attorney, Agent, or Firm* — Jeffrey G. Degenfelder; Carstens & Cahoon, LLP

(57) ABSTRACT

The improved gearbox mechanism of the present invention includes a plurality of cam-actuated gear block assemblies, which transfer power from a power shaft to a secondary or output gear element. Each gear block assembly includes a gear block having a surface that periodically interfaces with a secondary or output gear element. In a preferred embodiment the interface surface comprises a plurality of projections or teeth which correspond to complementary projections or gear teeth on the output gear element. Each gear block assembly further includes a gear block, a rocker arm, cam followers and/or gear block tracking post, which connect or link the gear block to a cam assembly, which in turn is connected to a power source. The cam assembly includes about its circumference a unique pathway or groove for each cam followers and/or gear block tracking post of a particular gear block assembly so that the movement of the gear block may be controlled in two or three dimensions in accordance with a certain design parameter.

20 Claims, 17 Drawing Sheets

Related U.S. Application Data 9,261,176, application No. 16/818,738, which is a continuation-in-part of application No. 16/266,629, filed on Feb. 4, 2019, now Pat. No. 10,830,318, which is a continuation-in-part of application No. 16/111,344, filed on Aug. 24, 2018, now Pat. No. 10,240,666, which is a continuation-in-part of application No. 14/995,094, filed on Jan. 13, 2016, now Pat. No. 10,260,606, which is a continuation of application No. 13/795,488, filed on Mar. 12, 2013, now Pat. No. 9,261,176.

(56) References Cited

U.S. PATENT DOCUMENTS

| | | | |
|---|---|---|---|
| 2,071,235 A | | 2/1937 | Newman |
| 2,134,603 A | | 10/1938 | Pickering |
| 2,167,590 A | | 7/1939 | Slaugenhop |
| 2,521,067 A | | 9/1950 | Kenison |
| 2,843,095 A | | 7/1958 | Prentice |
| 3,088,333 A | | 5/1963 | Walton |
| 3,386,298 A | | 6/1968 | Luther |
| 3,439,562 A | * | 4/1969 | Bickley ............. F16H 25/06 475/168 |
| 3,650,157 A | | 3/1972 | Stratheam et al. |
| 3,848,474 A | | 11/1974 | Epstein |
| 3,913,417 A | | 10/1975 | Vangor |
| 4,075,893 A | | 2/1978 | Koch |
| 4,179,945 A | | 12/1979 | Obermann |
| 4,413,961 A | * | 11/1983 | Griffin ............. F01C 1/067 418/38 |
| 4,713,985 A | * | 12/1987 | Ando ............. F16H 1/32 475/168 |
| 4,743,763 A | | 5/1988 | Cutburth et al. |
| 5,351,568 A | * | 10/1994 | Feterl ............. F16H 25/06 74/116 |
| 5,600,999 A | | 2/1997 | Folino |
| 5,722,910 A | | 3/1998 | Folino |
| 6,109,136 A | | 8/2000 | Dold |
| 6,202,509 B1 | | 3/2001 | Dold |
| 6,220,115 B1 | | 4/2001 | Him et al. |
| 6,231,468 B1 | | 5/2001 | Bajulaz |
| 6,805,025 B2 | | 10/2004 | Ruttor |
| 7,086,309 B2 | | 8/2006 | Stoianovici et al. |
| 7,211,016 B2 | | 5/2007 | Yan et al. |
| 8,516,981 B2 | | 8/2013 | Jacques et al. |
| 8,534,151 B2 | | 9/2013 | Johnson et al. |
| 8,998,763 B2 | | 4/2015 | Wengenroth |
| 9,261,176 B2 | | 2/2016 | Hoefken |
| 9,327,618 B2 | | 5/2016 | Villarroel et al. |
| 9,394,984 B2 | | 7/2016 | Balsiger |
| 2001/0020399 A1 | | 9/2001 | Angeles et al. |
| 2003/0047025 A1 | | 3/2003 | Ruttor |
| 2005/0229731 A1 | | 10/2005 | Parks et al. |
| 2005/0250617 A1 | * | 11/2005 | Sagawa ............. F16H 25/06 476/40 |
| 2007/0180940 A1 | | 8/2007 | Mizon et al. |
| 2010/0206686 A1 | | 8/2010 | Johnson et al. |
| 2011/0298322 A1 | | 12/2011 | Sherwin et al. |
| 2012/0289372 A1 | | 11/2012 | Wengenroth |
| 2012/0291731 A1 | | 11/2012 | Parsche |
| 2013/0255421 A1 | | 10/2013 | Schmidt et al. |
| 2014/0015382 A1 | | 1/2014 | Kim |
| 2014/0232159 A1 | | 8/2014 | Villarroel et al. |
| 2014/0248017 A1 | * | 9/2014 | Nakada ............. F16H 25/06 384/548 |
| 2014/0260721 A1 | * | 9/2014 | Hoefken ............. F16H 25/04 74/55 |
| 2016/0116021 A1 | | 4/2016 | Jacobson |
| 2016/0131232 A1 | | 5/2016 | Hoefken |
| 2016/0153535 A1 | | 6/2016 | Yang et al. |
| 2017/0023110 A1 | * | 1/2017 | Oledzki ............. F16H 25/06 |
| 2018/0149236 A1 | * | 5/2018 | Matsuoka ............. F16H 1/32 |
| 2018/0274639 A1 | * | 9/2018 | Hoefken ............. F16H 25/06 |
| 2018/0306285 A1 | * | 10/2018 | Noguchi ............. F16H 48/14 |
| 2018/0363745 A1 | * | 12/2018 | Hoefken ............. F16H 25/06 |
| 2019/0085954 A1 | * | 3/2019 | Hoefken ............. F16H 29/04 |
| 2019/0360564 A1 | * | 11/2019 | Hoefken ............. F16H 25/06 |
| 2020/0271203 A1 | * | 8/2020 | Hoefken ............. F16H 25/06 |

\* cited by examiner

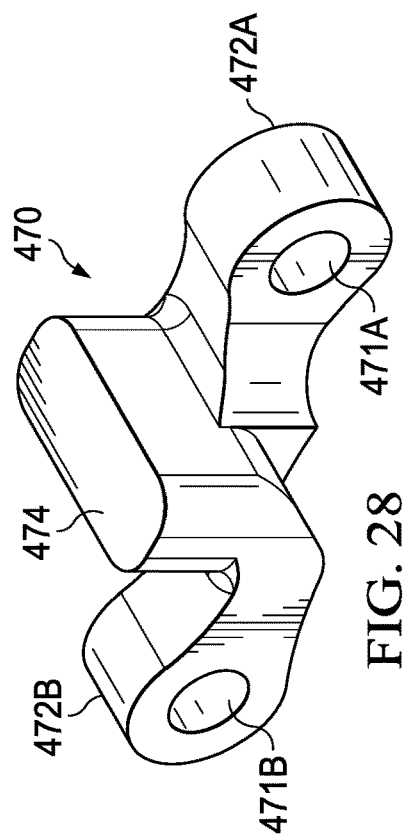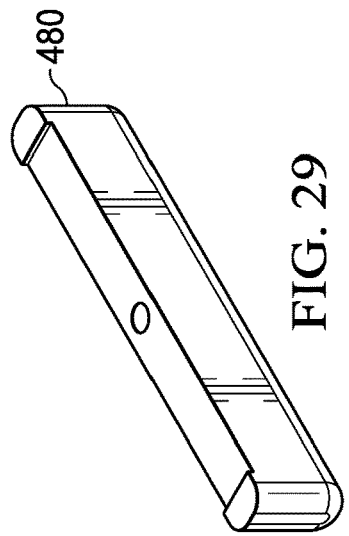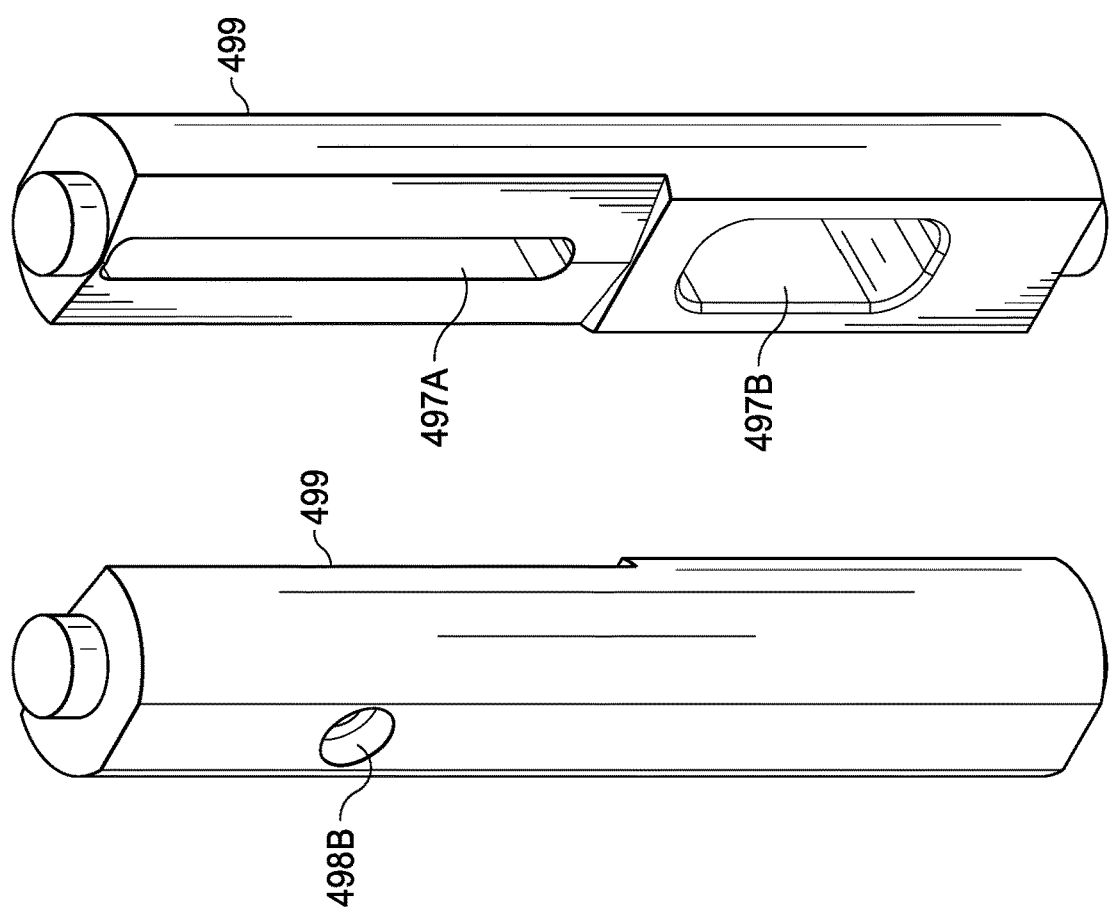

AXIAL CAM GEARBOX MECHANISM

CROSS-REFERENCE TO RELATED APPLICATION

This application is a continuation of U.S. patent application Ser. No. 16/537,218 filed Aug. 9, 2019, which is a continuation-in-part application of U.S. patent application Ser. No. 16/194,053 filed Nov. 16, 2018, which is a continuation-in-part application of U.S. patent application Ser. No. 14/995,094 filed Jan. 13, 2016 (now U.S. Pat. No. 10,260,606), which is a continuation application of U.S. patent application Ser. No. 13/795,488 filed Mar. 12, 2013 (now U.S. Pat. No. 9,261,176), the technical disclosures of which are hereby incorporated herein by reference. This application is also related to and a continuation-in-part application of U.S. patent application Ser. No. 16/266,629 filed Feb. 4, 2019, which is a continuation-in-part application of U.S. patent application Ser. No. 16/111,344 filed Aug. 24, 2018 (now U.S. Pat. No. 10,240,666), which is a continuation-in-part application of U.S. patent application Ser. No. 14/995,094 filed Jan. 13, 2016 (now U.S. Pat. No. 10,260,606), which is a continuation application of U.S. patent application Ser. No. 13/795,488 filed Mar. 12, 2013 (now U.S. Pat. No. 9,261,176), the technical disclosures of which are hereby incorporated herein by reference.

BACKGROUND OF THE INVENTION

1. Technical Field of the Invention

The present invention relates to a universal gearbox mechanism featuring cam-actuated gear block assemblies that periodically engage the output gear causing power transfer. It has particular, but not exclusive, application for use in servomotor assemblies.

2. Description of the Related Art

Conventional machines typically consist of a power source and a power transmission system, which provides controlled application of the power. A variety of proposals have previously been made in the art of power transmission systems. The simplest transmissions, often called gearboxes to reflect their simplicity (although complex systems are also called gearboxes in the vernacular), provide gear reduction (or, more rarely, an increase in speed), sometimes in conjunction with a change in direction of the powered shaft. A transmission system may be defined as an assembly of parts including a speed-changing gear mechanism and an output shaft by which power is transmitted from the power source (e.g., electric motor) to an output shaft. Often transmission refers simply to the gearbox that uses gears and gear trains to provide speed and torque conversions from a power source to another device.

Gearboxes have been used for many years and they have many different applications. In general, conventional gearboxes comprise four main elements: power source; drive train; housing and output means. The power source places force and motion into the drive train. The power source may be a motor connected to the drive train through suitable gearing, such as a spur, bevel, helical or worm gear.

The drive train enables the manipulation of output motion and force with respect to the input motion and force provided by the power source. The drive train typically comprises a plurality of gears of varying parameters such as different sizes, number of teeth, tooth type and usage, for example spur gears, helical gears, worm gears and/or internal or externally toothed gears.

The gearbox housing is the means which retains the internal workings of the gearbox in the correct manner. For example, it allows the power source, drive train and output means to be held in the correct relationship for the desired operation of the gearbox. The output means is associated with the drive train and allows the force and motion from the drive train to be applied for an application. Usually, the output means exits the gearbox housing.

The output means typically can be connected to a body whereby the resultant output motion and force from the drive train is transmitted via the output means (e.g., an output shaft) to the body to impart the output mean's motion and force upon the body. Alternatively, the output means can impart the motion and force output from the drive train to the gearbox housing whereby the output means is held sufficiently as to allow the gearbox housing to rotate.

Rotating power sources typically operate at higher rotational speeds than the devices that will use that power. Consequently, gearboxes not only transmit power but also convert speed into torque. The torque ratio of a gear train, also known as its mechanical advantage, is determined by the gear ratio. The energy generated from any power source has to go through the internal components of the gearbox in the form of stresses or mechanical pressure on the gear elements. Therefore, a critical aspect in any gearbox design comprises engineering the proper contact between the intermeshing gear elements. These contacts are typically points or lines on the gear teeth where the force concentrates. Because the area of contact points or lines in conventional gear trains is typically very low and the amount of power transmitted is considerable, the resultant stress along the points or lines of contact is in all cases very high. For this reason, designers of gearbox devices typically concentrate a substantial portion of their engineering efforts in creating as large a line of contact as possible or create as many simultaneous points of contacts between the two intermeshed gears in order to reduce the resultant stress experienced by the respective teeth of each gear.

Another important consideration in gearbox design is minimizing the amount of backlash between intermeshing gears. Backlash is the striking back of connected wheels in a piece of mechanism when pressure is applied. In the context of gears, backlash (sometimes called lash or play) is clearance between mating components, or the amount of lost motion due to clearance or slackness when movement is reversed and contact is re-established. For example, in a pair of gears backlash is the amount of clearance between mated gear teeth.

Theoretically, backlash should be zero, but in actual practice some backlash is typically allowed to prevent jamming. It is unavoidable for nearly all reversing mechanical couplings, although its effects can be negated. Depending on the application it may or may not be desirable. Typical reasons for requiring backlash include allowing for lubrication, manufacturing errors, deflection under load and thermal expansion. Nonetheless, low backlash or even zero backlash is required in many applications to increase precision and to avoid shocks or vibrations. Consequently, zero backlash gear train devices are in many cases expensive, short lived and relatively heavy.

Weight and size are yet another consideration in the design of gearboxes. The concentration of the aforementioned stresses on points or lines of contact in the intermeshed gear trains necessitates the selection of materials that are able to resist those forces and stresses. However, those materials are oftentimes relatively heavy, hard and difficult to manufacture.

Thus, a need exists for an improved and more lightweight gearbox mechanism, which is capable of handling high stress loads in points or lines of contact between its intermeshed gears. Further, a need exists for an improved and more lightweight gearbox mechanism having low or zero backlash that is less expensive to manufacture and more reliable and durable.

SUMMARY OF THE INVENTION

The present invention overcomes many of the disadvantages of prior art gearbox mechanisms by utilizing a plurality of cam-actuated gear block assemblies to transfer power from a power shaft to a secondary or output gear element. In one embodiment, each gear block assembly includes a gear block having a surface that periodically interfaces with a secondary or output gear element. In a preferred embodiment the interface surface comprises a plurality of projections or teeth which correspond to complementary projections or gear teeth on the output gear element. Each gear block assembly further includes a plurality of linkage assemblies, which connect or link the gear block to a cam assembly, which in turn is connected to a power source. The cam assembly includes about its circumference a unique pathway or groove for each linkage assembly of a particular gear block assembly so that the movement of the gear block may be controlled in two dimensions in accordance with a certain design parameter.

The gear block assembly is designed to drive its respective gear block through a two-dimensional circuit in response to rotation of the cam assembly. Broadly speaking, the two-dimensional circuit includes urging the gear block to engage a secondary or output gear element and move or rotate a specified quantum distance prior to disengaging from the output gear element, and returning back the specified quantum distance to again reengage the secondary or output gear element once again and repeat the process. The travel path or circuit of each gear block is controlled by adjusting the length and configuration of the various linkage assemblies and altering the pathways or grooves formed in the cam assembly.

When adapted to a gearbox mechanism a plurality of gear block assemblies are configured about a central axis of the cam assembly. The cam assembly is rotatively coupled with a power source. As the cam assembly rotates, the cam follower elements of the respective linkage assemblies of each gear block assembly maintain contact with a particular pathway or groove formed in the circumferential surface of the cam assembly. The variance of distance from the center of rotation of the different pathways or grooves of the cam assembly causes the respective linkage assemblies to work in concert to move their respective gear block through a predetermined circuit of movement. This predetermined circuit of movement of the gear block can be precisely calibrated to meet specific engineering requirements. For example, the torque ratio and speed reduction may be regulated and controlled by adjusting the circuit of movement of each gear block assembly.

Another embodiment of a gearbox mechanism of the present invention may include a main body, an output element, and a plurality of simplified gear block assemblies. Additionally, the gearbox mechanism may have a retainer that interfaces with the main body and the output element. Each simplified gear block assembly includes a gear block, a torque lever, cam follower(s), and/or socket (or a portion of a socket). The cam actuated gear block assemblies are configured about a central axis. The rotational force on the cam element allows for a driving or rotative force on the cam actuated gear block assemblies.

In a preferred embodiment, the torque lever also has a set of cam followers allowing for the following of a specified path formed along a planar surface of the cam element. The cam element includes at least one unique pathway or groove that interfaces with the cam follower of gear block or torque lever so that as the cam element rotates, the movement of the gear block or torque lever is controlled in two dimensions in accordance with at least one certain design parameter.

By varying the radius of the pathway or grooves on the cam element, the cam actuated gear block assemblies drive respective gear block(s) through a two-dimensional circuit in response to rotation of the cam element. Broadly speaking, the two-dimensional circuit includes urging the gear block to engage the output element and move and/or rotate the output element a specified distance prior to disengaging from the output element, and returning back the specified distance to again reengage the output element once again, and repeat the process. The travel path or circuit of each gear block is controlled by adjusting the length, width, height, and/or size of the respective gear block and/or torque lever and/or altering the pathways or grooves formed in the cam element. In a preferred embodiment, there is at least one pivot point for both the gear block and the torque lever that allows each to pivot separately from each other.

Another embodiment of the gearbox mechanism of the present invention may include a cam element, a main body and output element and a plurality of simplified gear block assemblies. In at least one example, the output element is retained within the main body by a retainer. The gear block assemblies are placed within the main body and interface with the output element and cam element. The gear block assemblies can include a rocker arm, a gear block, a cam follower, and a pathway tracker. The cam follower and/or pathway tracker follow pathways in the cam element and/or an axial cam to generate forces on the rocker arm and/or the gear block(s) generating a pivoting motion for the both the rocker arm and the gear block(s). In at least one version, the pivoting motion can be a generally square pivot path for the gear block(s). While in other versions, the pivot path of the gear block(s) will generally be oval or circular.

In at least one variant embodiment, a central aperture aligned with a central axis may be a part of the gearbox mechanism. Each gear block assembly includes a gear block, a rocker arm, and at least one cam follower, which connect the gear block to the planar surface of the cam element. The rocker arm, and/or gear block can interact to be pivotally attached, and correspond to the interaction and/or engagement of the cam follower(s) with the cam element. The rotation of the output element may also be controlled through a reverse or tension engagement (i.e., negative bias) of gear block(s) that are not in a driving or positive bias rotational engagement in order to reduce and/or element backlash.

In at least one version, the main body provides a housing for the gear assemblies. The gear block assemblies rest and/or are supported by the main body retaining surface. The gear block(s) may also be retained and/or supported by the main body gear block interface surface. The rocker arm(s) may also be supported and/or retained by the main body interface surface, and/or the main body rocker arm void as defined by the main body. The pivoting motion of the rocker arm can also coincide with a pivoting motion of the gear block that allows for the interfacing, engaging, and/or rotating of an output element.

Numerous embodiments of gearbox mechanisms are possible using the gear block assembly of the present invention. The plurality of gear block assemblies configured about the central axis of the cam assembly can comprise either an odd or even number of gear block assemblies. At least two, and preferably three gear block assemblies are required for a gearbox mechanism of the present invention. The movement of the gear block assemblies typically move in a rotational series to one another. At least one gear block assembly is always engaged with the output gear element at any particular instance in time. Preferably, only one gear block assembly is disengaged with the output gear element at any particular instance in time. However, in another preferred embodiment wherein the plurality of gear block assemblies comprises four or more even-numbered gear block assemblies, the gear block assemblies configured on opposing sides of the cam assembly engage and disengage in unison from the secondary or output gear element.

The design of the gear block assemblies of the present invention enable a greater number of gear teeth to engage the output gear at any given time, thereby spreading the stresses associated therein across a greater area. By dramatically increasing the contact area between the gear block and the output gear at any given time the mechanical stress level is significantly decreased. In addition, the gear block assemblies of the present invention reduce backlash to zero and even preloaded conditions to create a tight connection between the power source and the powered device. This is an extremely desirable feature especially for high vibration applications. By reducing backlash to zero or preloaded condition, the mechanical impedance may also be reduced at a broad range of high vibration frequencies. Moreover, because the stresses associated with engagement of the gear block against the output gear are distributed across a greater area, the gear block mechanism may be manufactured of lighter weight, more flexible materials, which are less expensive and easier to manufacture, with no degradation in reliability. Indeed, using flexible materials further reduces the mechanical impedance at low frequencies. By reducing its weight and size, the gearbox mechanism of the present invention is adaptable to a broad range of applications that were previously impractical because of weight and space limitations.

BRIEF DESCRIPTION OF THE DRAWINGS

A more complete understanding of the method and apparatus of the present invention may be had by reference to the following detailed description when taken in conjunction with the accompanying drawings, wherein:

FIG. 26 is a front side view of a rocker arm of the gear block assembly shown in FIG. 23;

FIG. 27 is a rear side view of the rocker arm thereof;

FIG. 28 is a perspective view of a rocker block of the gear block assembly shown in FIG. 23;

FIG. 29 is a perspective view of a rocker pin of the gear block assembly shown in FIG. 23.

Figure 1A:
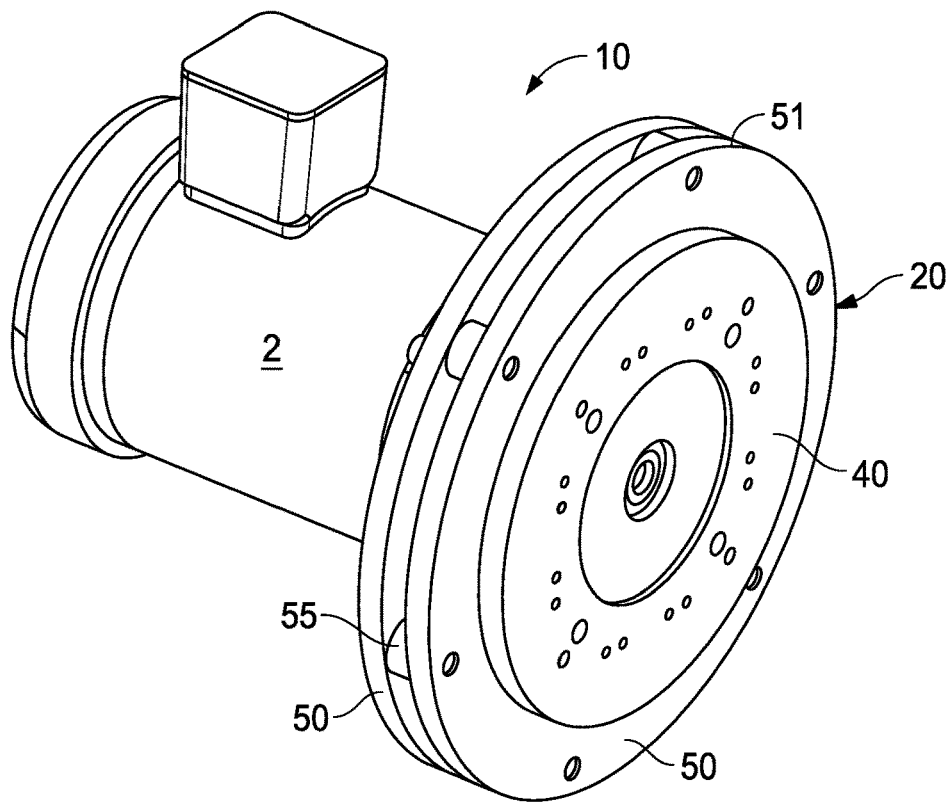
FIG. 1A is a perspective view of a first embodiment of a gearbox mechanism attached to a power source as previously disclosed in co-pending application Ser. No. 16/194,053, the disclosure of which is fully incorporated herein by reference.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1B:
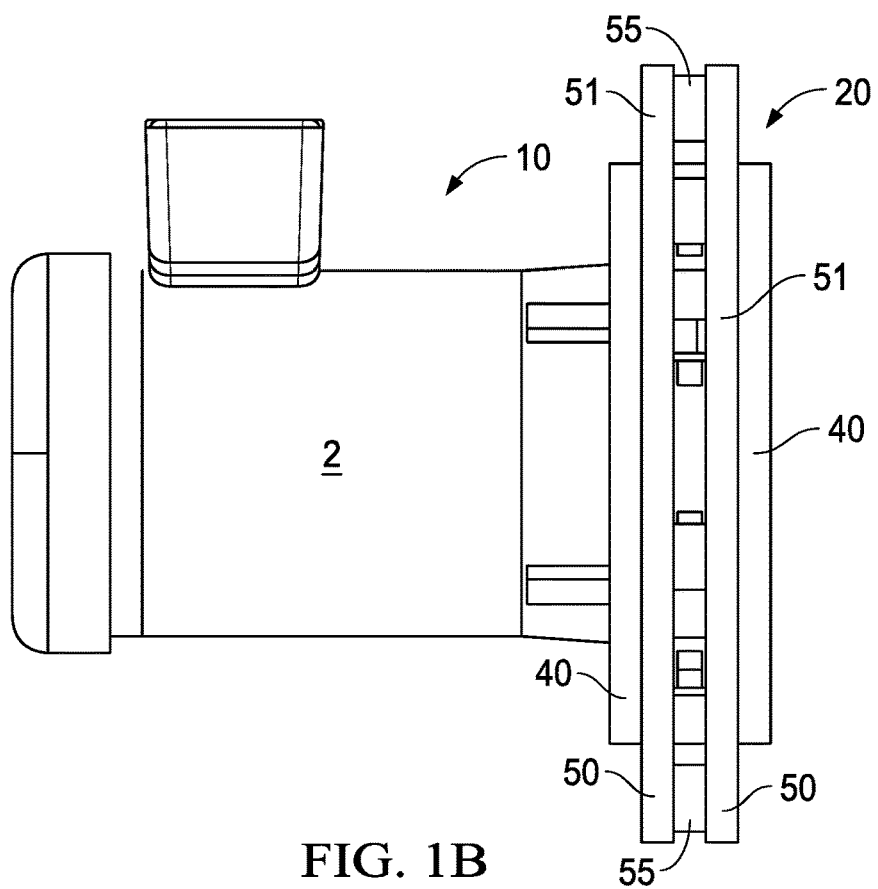
FIG. 1B is a side elevation view thereof.
Figure 2:
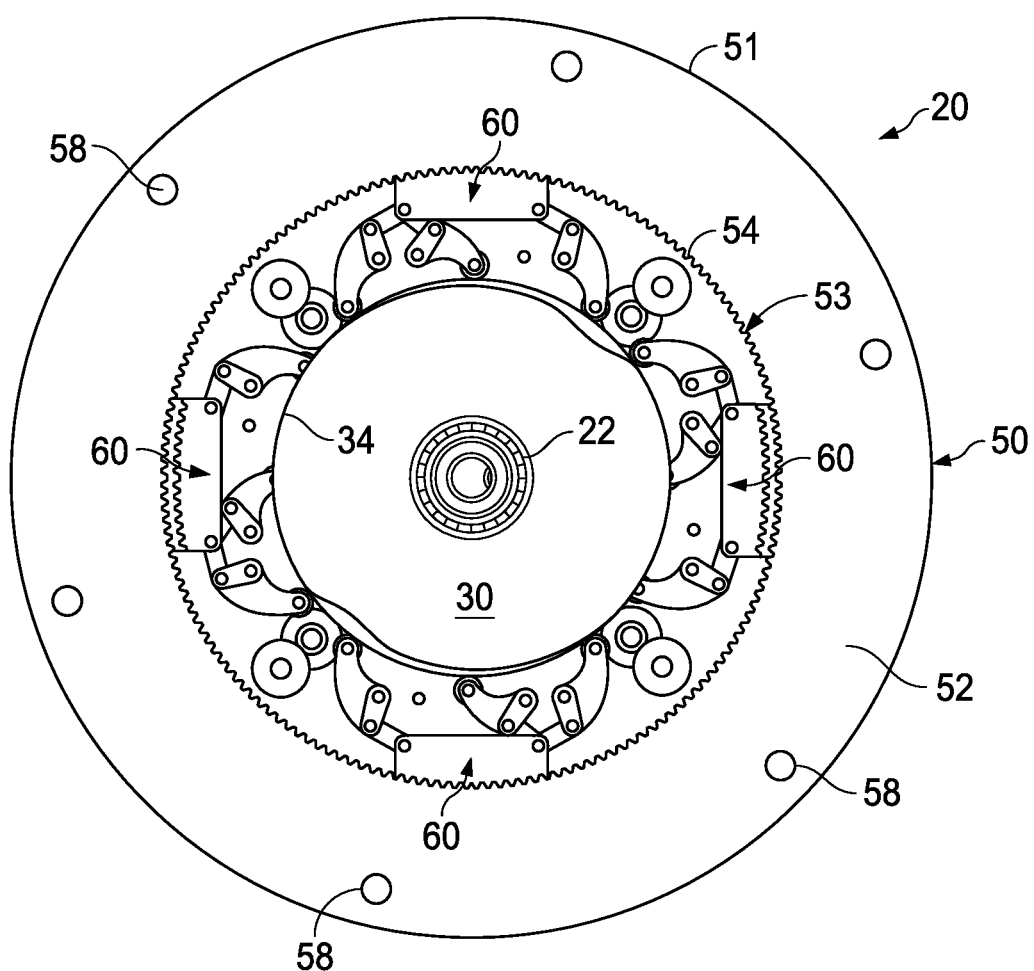
FIG. 2 is an end view thereof with the outer stationary plate removed.

With reference to the Figures, and in particular FIGS. 1A, 1B and 2, an embodiment of a machine 10 utilizing a gearbox mechanism 20 is depicted as previously disclosed in co-pending application Ser. No. 16/194,053, the disclosure of which is fully incorporated herein by reference. The machine 10 includes a power source or actuator 2, which includes an output device (not illustrated) that transmits the power generated by the power source 2. While the embodiment shown in the Figure generally depicts the power source 2 as an electric motor and the output device as an output shaft of the electric motor, it is understood that there are numerous possible embodiments. For example, output device need not be directly connected to the power source 2 but may be rotatively coupled by means of gears, chains, belts or magnetic fields. Likewise, the power source 2 may comprise an electric motor, an internal combustion engine, or any conventional power source that can be adapted to generate rotative power in an output device. Moreover, the power source 2 may also comprise the output gear of a preceding gear train mechanism.

As shown in the embodiment depicted in FIGS. 1A, 1B and 2, the plurality of cam-actuated gear block assemblies 60 transfer power from the power shaft 4 to an annular secondary or output gear element 50. In a preferred embodiment, each gear block assembly 60 includes a gear block 62 having an interface surface 63 (e.g., a plurality of projections or teeth 66) which correspond to a complementary interface surface 54 (e.g., projections or gear teeth) configured on an inner circumferential surface 53 of the annular secondary or output gear element 50. It is understood that the interface between the gear block 62 and the inner circumferential surface 53 of the output gear element 50 of the present invention comprises not only the preferred gear teeth as depicted, but also any complementary arrangement such as pins and holes or even friction fit surfaces.

While the annular output or power gear element 50 is depicted as two circular rings held apart by spacer elements 55, it is understood that the output or power gear element 50 may comprise a single circular ring. The output or power gear element 50 includes apertures or holes 58 for attaching to an output shaft or power takeoff (not shown). In addition, it is understood that the outer circumference 51 of the output or power gear element 50 may also comprise a surface to interface with some other gear train mechanism.

The gear blocks 62 of the present invention are specifically designed to enable a greater surface area (e.g., greater number of gear teeth) to engage the output gear 50 at any given time, thereby spreading the stresses associated therein across a greater area. By dramatically increasing the contact area between the gear block 62 and the output gear 50 at any given time the mechanical stress level is significantly decreased. In addition, the gear block 62 assemblies of the present invention reduce backlash to zero and even pre-loaded conditions to create a tight connection between the power source 2 and the powered device. This is an extremely desirable feature especially for high vibration applications. Moreover, because the stresses associated with engagement of the gear block 62 against the output gear 50 are distributed across a greater area, the gear block 62 may be manufactured of lighter weight materials, which are typically less expensive and easier to manufacture, with no degradation in reliability. For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large area of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism of the present invention is adaptable to a broad range of applications that were previously impractical because of weight and space limitations.

The cam assembly 30 is coupled to the power source 2 by means of the output device or power shaft (not illustrated). Thus, power generated by the power source 2 is transferred to the power shaft, which causes the cam assembly 30 to rotate about the central axis 6. The cam assembly 30 includes about its circumferential surface 34 a plurality of unique pathways or grooves which each interface with the cam follower element of a single linkage assembly of each gear block assembly 60 so that as the cam assembly 30 rotates, the movement of the gear block 62 is controlled in two dimensions in accordance with a certain design parameter. By varying the radius of the pathway or grooves on the cam assembly 30 the linkage assemblies of the gear block assembly 60 drive respective gear block 62 through a two-dimensional circuit in response to rotation of the cam assembly 30. Broadly speaking, the two-dimensional circuit includes urging the gear block to engage the output gear element 50 and move or rotate the output gear element 50 a specified quantum distance prior to disengaging from the output gear element 50, and returning back the specified quantum distance to again reengage the output gear element 50 once again and repeat the process. The travel path or circuit of each gear block 62 is controlled by adjusting the length and configuration of the various linkage assemblies and altering the pathways or grooves formed in the cam assembly 30.

In a preferred embodiment, each linkage mechanism includes two pivotally coupled connector arms. An upper connector arm includes a first pivot point that is pivotally coupled to its respective gear block 62 and a second pivot point pivotally coupled to a lower connector arm. The lower connector arm includes a cam follower element at its distal end that maintains contact with its respective pathway or groove formed in the cam assembly 30. The lower connector arm further includes a pivot point having a fixed axis of rotation relative to the central axis 6 of rotation of the cam assembly 30.

Figure 3:
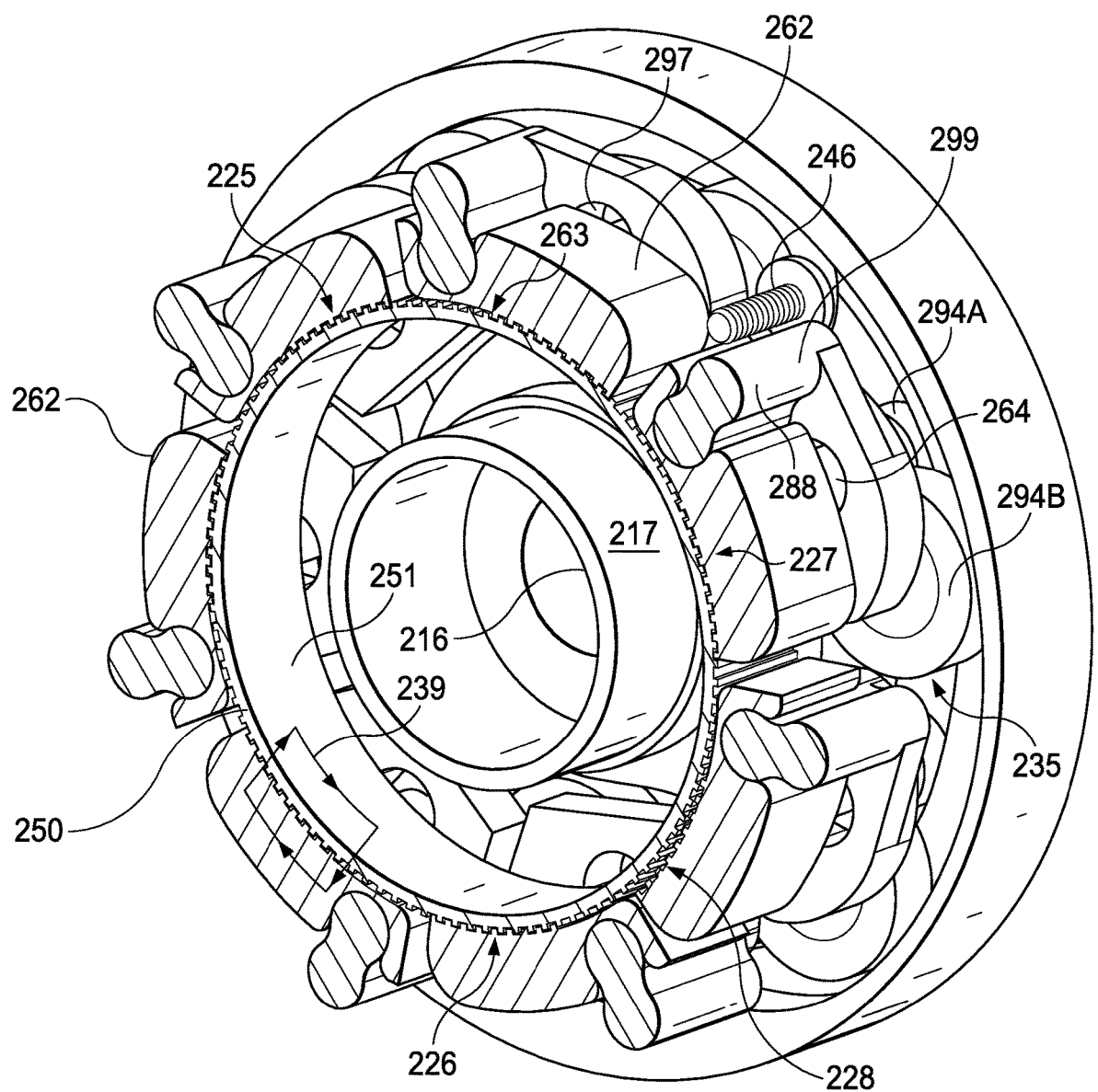
FIG. 3 is a perspective view of a second embodiment of a gearbox mechanism as previously disclosed in co-pending application Ser. No. 16/266,629, the disclosure of which is fully incorporated herein by reference.

With reference now to FIG. 3 an illustration of a second embodiment of a gearbox mechanism is depicted as previously disclosed in co-pending application Ser. No. 16/266,629, the disclosure of which is fully incorporated herein by reference. FIG. 3 depicts a perspective view of the gear block assemblies 260 interfacing with an output element 250 of the gearbox mechanism. The gear block assemblies 260 can include a gear block 262, a torque lever 299, a first cam follower 294A, and/or a second cam follower 294B. In at least one version the first cam follower 294A is coupled to the gear block 262, and the second cam follower 294B is coupled to the torque lever 299. As the cam followers 294A/294B traverse the first and second pathways 236/237 they generate radial and angular movements of the torque lever 299 and/or the gear block 262. These longitudinal and latitudinal movements of the torque lever 299 and/or gear block 262 allow for and/or generate the pivot movements of the torque lever 299, and/or gear block 262. In at least one example, a spacer 246 can be utilized to support and/or engage the torque lever 299.

The torque lever pivot post 288 and the gear block pivot void 297 interact to generate forces that cause the gear block 262 to engage and/or disengage from the output element 250. The movement of a gear block 262, in at least one example, is a cyclical, annular or closed loop movement that may have a generally rectangular, elliptical, circular, square, conical, oval, ovoid, truncated circular pattern, or any combination thereof, design specified pattern of movement.

For example, a gear block interface surface 263 can engage and/or disengage from an output element interface surface. The gear block 262 will move in a cyclical manner as a result of the pivot movements of the torque lever 299 and cam followers 294A/294B. In at least one version, the gear block can have four positions. A first position 228 (or transitioning position) allows for the gear block to traverse or move to a new position to begin a new rotation of the output element 250. The second position 226 (or engaged or positive bias movement position) allows for the gear block to generate a rotational or pulling force 228 on the output element 250. The third position 225 (or neutral or balanced position) may allow the gear block 262 to be in a position to engage, rotate, or disengage from the output element interface surface with no forces generated on the output element. The fourth position 227 (i.e., reverse tension or negative bias configuration) allows for a tension to be placed on the output element 250 to assist in the prevention and/or elimination of backlash of the output element 250.

The cam element guide 216 can be interfaced with the output element 250 through a rotational support, ball bearing assembly, and/or set of ball bearings (not illustrated) that can be placed between the cam element guide circumferential surface 217 and the output element circumferential surface 251.

As shown in the embodiment depicted in the Figures, the plurality of cam-actuated gear block assemblies 260 transfer power from an input or rotating device (not illustrated) to an output element 250. In a preferred embodiment, each gear block assembly 260 includes a gear block 262 having an interface surface 263 (e.g., a plurality of projections or teeth 266) which correspond to a complementary output element interface surface 254 (e.g., projections or gear teeth) configured on an outer circumferential surface 251 of the output element 250. The present invention comprises not only the preferred gear teeth as depicted, but also any complementary arrangement such as pins and holes or even friction fit surfaces.

While the output element 250 is depicted as a single circular ring, it is understood that the output element 250 may comprise two circular rings held apart by spacer elements (not illustrated). The output element 250 includes apertures or holes 258 for attaching to an output shaft or power takeoff (not illustrated). In addition, it is understood that the inner circumference 251 of the output element 250 may also comprise a surface to interface with some other gear train mechanism.

In addition, it is understood that the gear block 262 may include a divider/alignment block (not illustrated) dividing the interface surface 263 into two separate sections. The variant of the gear block 262 featuring the alignment block (not illustrated) is particularly suitable to embodiments which feature output elements 250 comprised of circular rings. The gear block 262 can have a gear block post 264 that may interact with a torque lever aperture 297 to provide a pivot point for the gear block 262 and/or torque lever 299.

The gear blocks 262 of the present invention are specifically designed to enable a greater surface area (e.g., greater number of gear teeth) to engage the output element 250 at any given time, thereby spreading the stresses associated therein across a greater area. By dramatically increasing the contact area between the gear block 262 and the output element 250 at any given time the mechanical stress level is significantly decreased. In addition, the gear block 262 assemblies 260 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 262 against the output element 250 are distributed across a greater area, the gear block 262 may be manufactured of lighter-weight materials, which are typically less expensive and easier to manufacture, with no degradation in reliability.

The cam element 230 can be coupled to an input device, power source, or other rotating device (not illustrated) by means of a shaft, gears, belts, magnetic fields, friction fit, or other means of coupling. Power generated by an input device, power source, or other rotating device (not illustrated) can be transferred to a shaft, gears, belts, magnetic fields, friction fit, or other means of coupling, which causes the cam element 230 to rotate about the central axis 206. The cam assembly 230 includes along its planar surface a plurality of unique pathways or grooves which each interface with the cam follower(s) 294 of a gear block assembly 260 so that as the cam element 230 rotates, the movement of the gear block 262 is controlled in two dimensions in accordance with a certain design parameter. By varying the radius of the pathway or grooves on the cam element 230 the gear block assemblies 260 drive respective gear block(s) 262 through a two-dimensional circuit in response to rotation of the cam element 230. Broadly speaking, the two-dimensional circuit includes urging the gear block 262 to engage the output element 250 and move or rotate the output element 250 a specified distance prior to disengaging from the output element 250, and returning back the specified distance to again reengage the output element 250 once again and repeat the process. The travel path or circuit of each gear block 262 is controlled by adjusting the size, height, length and configuration of the torque lever(s) 299, gear block(s) 262, and/or cam follower(s) 294 and altering the pathways or grooves formed in the cam element 230.

For example, the pivotal connections may further include torsional spring elements (not shown) which bias the torque lever 299, and/or gear block 262 so that the cam follower 294 maintains contact with the surface of its respective pathway or groove 236, 237 formed in the planar surface 235 of the cam element 230 throughout the rotation cycle of the cam element 230. In one embodiment, the planar surface of the cam assembly 230 is substantially perpendicular to the axis of rotation of the cam assembly 230. Alternatively, or in addition, a ring spring connecting all of the gear blocks 262 in a gear train may be used as a biasing mechanism in accordance with the present invention.

The gear block assemblies 260 are biased and/or secured so that each cam follower 294 maintains contact with the surface of its respective pathway or groove formed in the cam element 230 throughout the rotation cycle of the cam element 230. For example, cam follower 294A maintains contact with the surface of a first pathway 236, and cam follow 294B maintains contact with the surface of a second pathway 237. Each pathway has a unique circumference, the radius of which varies over the course of the pathway.

By varying the radius of each pathway or groove 236, 237 on the cam element 230, torque lever(s) 299 drive their respective gear block(s) 262 through a two-dimensional circuit in response to rotation of the cam element 230. In general, the two-dimensional circuit 239 includes urging the gear block 262 to engage the output element 250 and move or rotate the output element 250 a specified distance prior to disengaging form the output element 250, and returning back the same specified distance to again reengage the output element 250 once again and repeat the process. It is understood that the two-dimensional circuit 239 depicted in the drawings is not to scale and is somewhat exaggerated to illustrate the general principal of the invention. For example, the distance A-B would typically be much smaller than depicted. The travel path or circuit 239 of each gear block 262 is controlled by adjusting the size and configuration of the torque lever(s) 299, gear block(s) 262, and/or altering the pathways or grooves 236, 237 formed in the cam element 230.

When adapted to a gearbox mechanism 220, a plurality of gear block assemblies 260 are configured about the central axis 206 of the cam element 230. The cam element 230, in at least one version, may be coupled to a power source (not illustrated) by an output device (not illustrated). As the cam element 230 rotates, the cam follower(s) 294 of the respective torque lever(s) 299 and/or gear block(s) 262 of each gear block assembly 260 maintain contact with a particular pathway or groove 236, 237 formed in the planar surface 235 of the cam element 230. The variance of distance from the center of rotation of the different pathways or grooves 236, 237 of the cam element 230 causes the torque lever(s) 299 pivotally attached to a cam follower(s) 194 to work in concert to move their respective gear block(s) 262 through a predetermined circuit of movement 239. This predetermined circuit of movement 239 of the gear block 260 can be precisely calibrated to meet specific engineering requirements. For example, the torque ratio and speed reduction may be regulated and controlled by adjusting the circuit of movement 239 of each gear block assembly 260.

Figure 4:
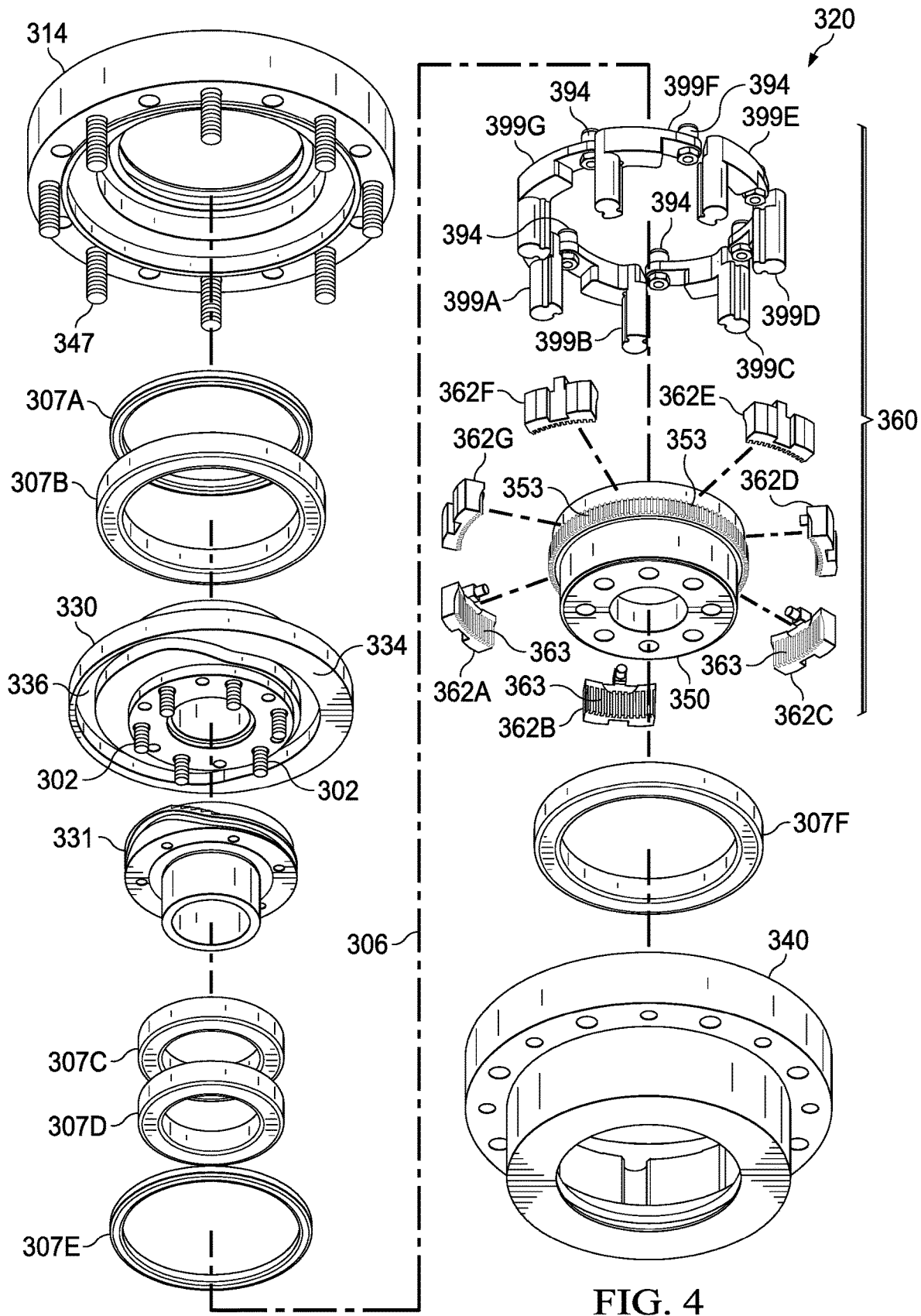
FIG. 4 is an illustration of an exploded perspective view of a third embodiment of a gearbox mechanism of the present invention.
Figure 5:
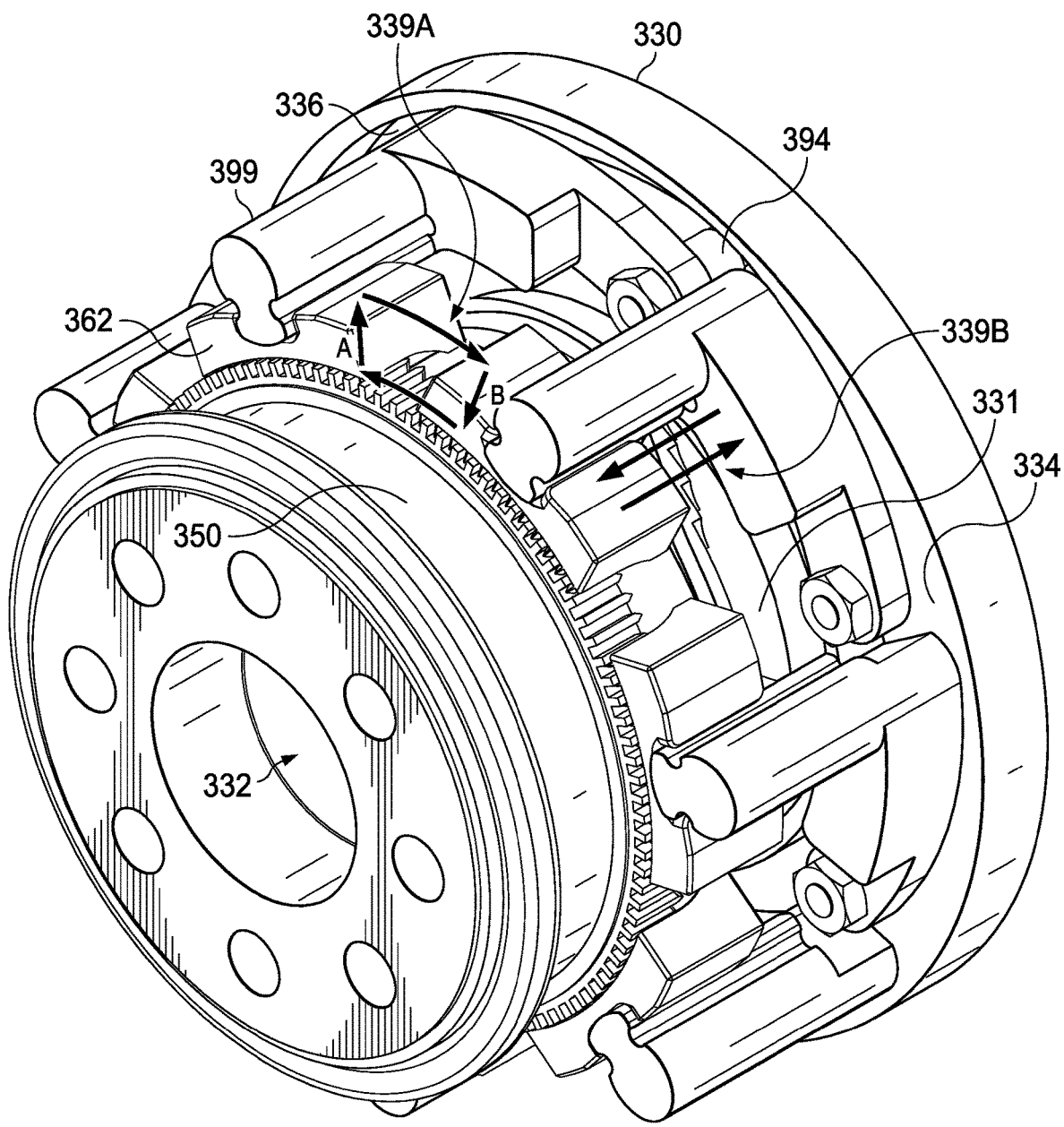
FIG. 5 is an illustration of a perspective view of an output element, cam element, and gear block assembly thereof.
Figure 6:
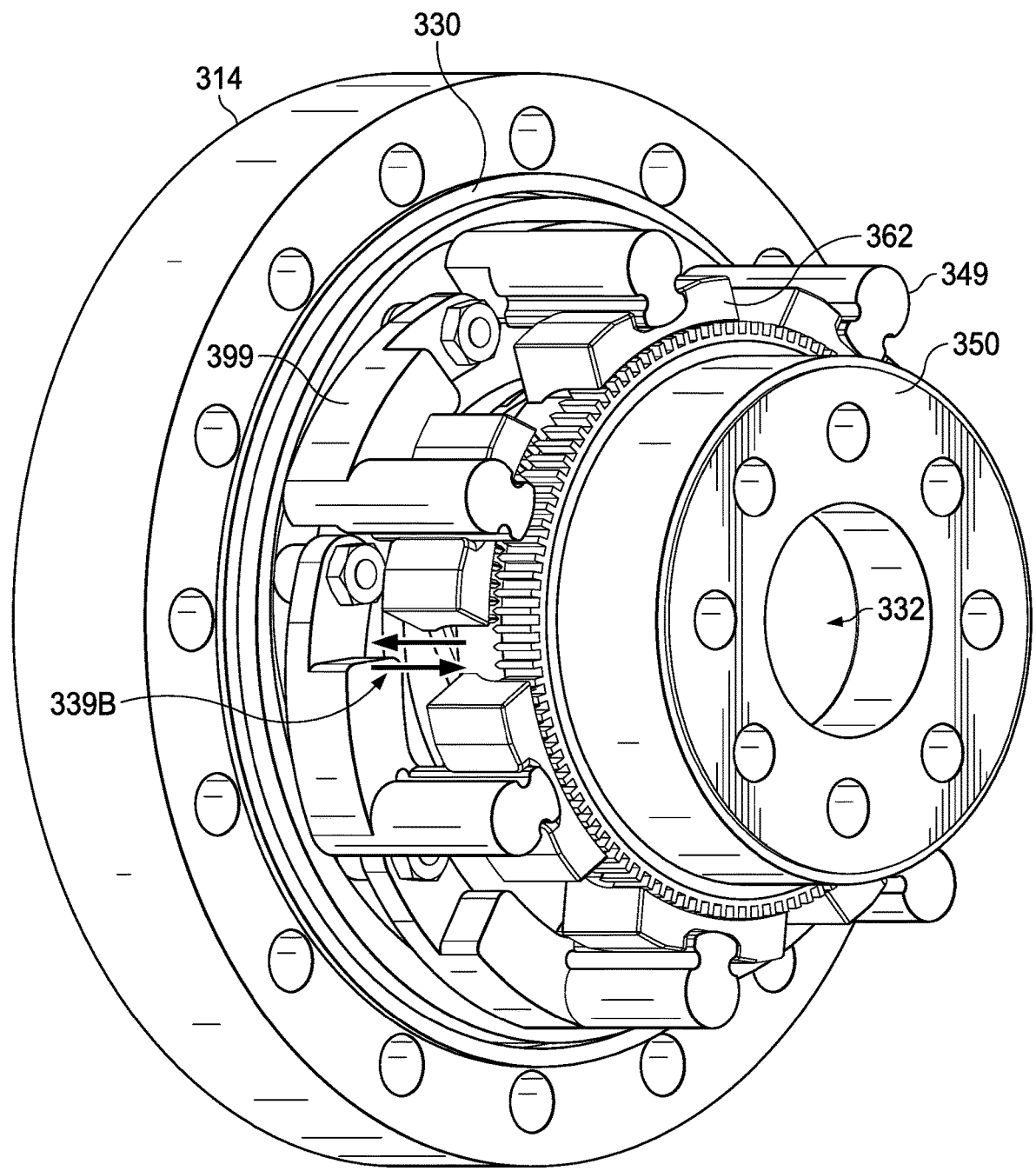
FIG. 6 is an illustration of an alternative perspective view of a hub, gear block assemblies, and output element thereof.
Figure 7:
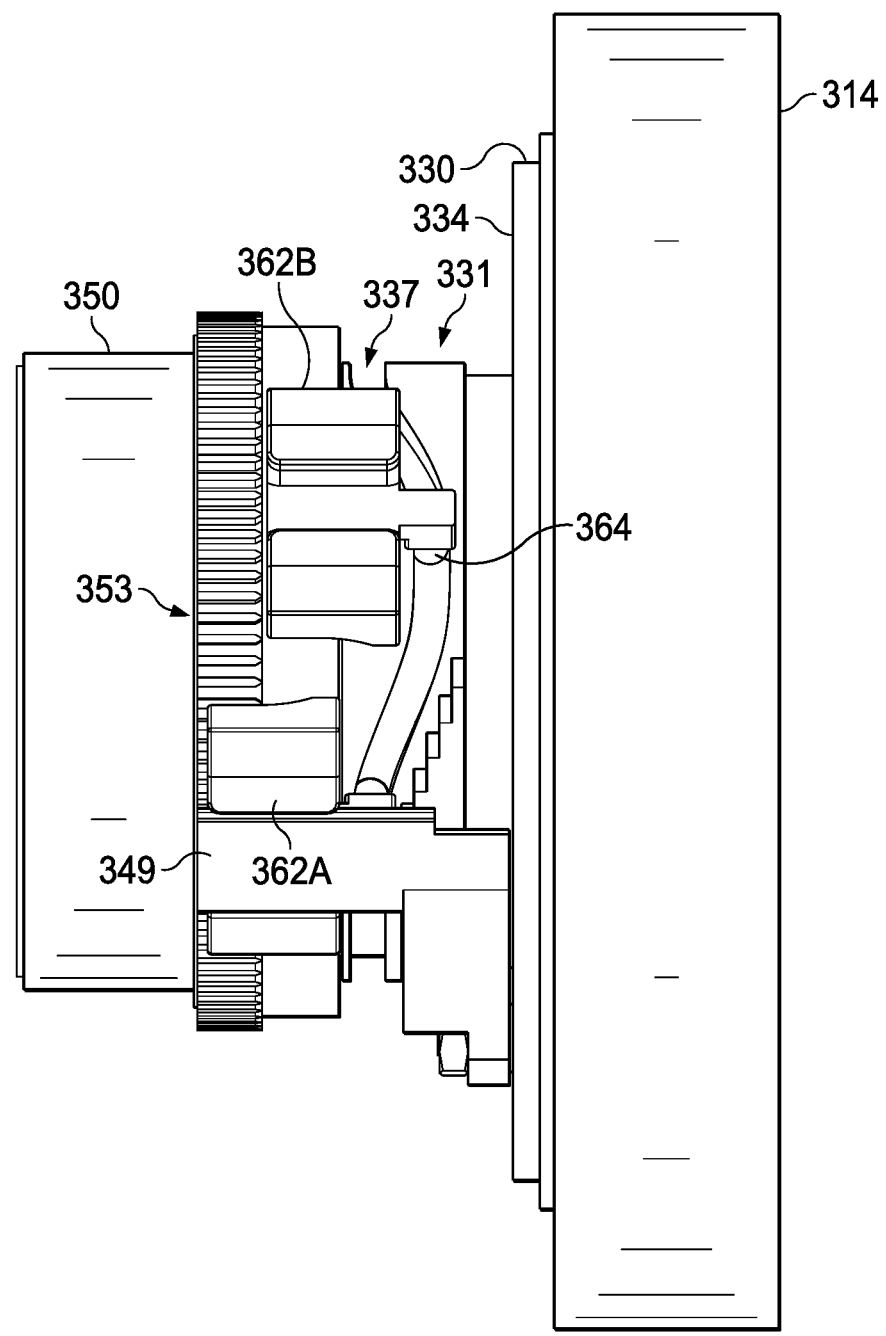
FIG. 7 is an illustration of a side view a hub, gear block assemblies, and output element thereof.

With reference to the Figures, and in particular FIGS. 4, 5, and 6, a third embodiment of a gearbox mechanism 320 of the present invention is depicted. The gearbox mechanism 320 may be powered and/or rotated by a power source or actuator (as shown in FIGS. 1A and 1B), that is transmitted to an output device (not illustrated) by the gearbox mechanism 320. The power source can be an electric motor, combustion engine, water activated source, wind turbine, or other possible embodiments. Additionally, the power source or actuator, as well as the output device (not illustrated) may be rotatively coupled by means of gears, chains, belts, or magnetic fields.

The gearbox mechanism 320 can be configured about a central axis 306. The central axis 306 can pass through a central aperture of the main body 340, the output element 350, cam element 330, axial cam 331, and hub 314. The main body 340 and the hub 314 may be coupled together through fasteners 347. The fasteners 347 may be screws, bolts, all thread, compression fit devices, or other means for fastening two components together in a fixed or secure manner. There can be bearings, or roller bearings 307 that may separate each of the output element 350, axial cam 331, and cam element 330 from the main body 340 and/or the hub 314. In at least one example, there may also be bearings or roller bearings 307 that separate the output element and the axial cam 331.

In some embodiments, a cam assembly is created by coupling together the axial cam 331 and cam element 330 using fasteners like fasteners 302, wherein the axial cam 331 and cam element 330 interact with gear block assemblies. The fasteners 302 may be screws, bolts, all thread, compression fit devices, or other means for fastening axial cam 331 and cam element 330 together in a fixed or secure manner. The gearbox mechanism 320 further includes a plurality of gear block assemblies 360. Each gear block assembly 360 can include a rocker arm 399 (rocker arms 399A, 399B, 399C, 399D, 399E, 399F, and 399G collectively referred to as rocker arm(s) 399) that are coupled with the gear block(s) 362 (gear blocks 362A, 362B, 362C, 362D, 362E, 362F, and 362G may be referred to collectively as gear block(s) 362). The gear blocks 362 of the present invention are specifically designed to enable a greater surface area (e.g., greater number of gear teeth) to engage the output element 350 at any given time, thereby spreading the stresses associated therein across a greater area. By dramatically increasing the contact area between the gear block 362 and the output element 350 at any given time the mechanical stress level is significantly decreased. In some embodiments the gear block(s) 362 may have a pathway tracker that can, individually or in combination with a pathway follower element, track and/or follow a pathway formed into the axial cam 331. The pathway follower element can include a ball bearing, roller bearing, or other mechanism or means for reducing friction. In addition, the gear block assemblies 360 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 362 against the output element 350 are distributed across a greater area, the gear block 362 may be manufactured of lighter-weight materials, which are typically less expensive and easier to manufacture, with no degradation in reliability.

For example, per Hertz Contact Theory, a typical stress result for spur gears, are in the range from 450 MPa to 600 MPa. High grade steels are the best fitted materials for handling such high stress levels. Other materials, like low grade steel or aluminum, will deform under the similar conditions. However, by distributing the stresses across large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism 320 of the present invention is adaptable to a broad range of applications that were previously impractical because of weight and space limitations.

In some embodiments, the rocker arm 399 can also have a cam follower 394 allowing for the following of a specified pathway(s) formed in or along a planar surface 334 of the cam element 330. While the planar surface 334 in FIGS. 4, 5, and 6, is depicted on the side of the cam element 330 facing the axial cam 331, it should be understood that the planar surface, into which pathway(s) 336 may be formed, may either face the axial cam 331 or face away from the axial cam 331. The gearbox mechanism 320 can also include a hub 314 and/or a ball bearing assembly 307 that allows the cam element 330 to rotate freely based upon an input device such as a shaft or rotatable elements such as a set of other gearing, belts, levers, magnetic or electrical fields, etc. In at least one example, there may be multiple ball bearing assemblies 307A, 307B, 307C, 307D, 307E, and/or 307F (collectively 307) that allow for reduced friction and freedom of movement for any rotational components. The interface surface 363 of each gear block 362 can engage with the output element interface surface 353 of the output element 350. In some embodiments, the gear blocks 362 are articulated by an associated movement of the rocker arm 399.

The cam element 330 includes at least one unique pathway or groove 336 that interfaces with the cam follower 394 of each rocker arm 399 so that as the cam element 330 rotates, the movement of the gear block 362 and/or rocker arm 399 is controlled in two dimensions in accordance with at least one certain design parameter. By varying the radius of the pathway or grooves 336 on the cam element 330, the gear block assemblies 360 drive their respective gear block(s) 362 through a two-dimensional circuit in response to rotation of the cam element 330. Broadly speaking, the two-dimensional circuit includes urging the gear block(s) 362 to engage the interface surface 353 of the output element 350 and move and/or rotate the output element 350 a specified distance prior to disengaging from the output element 350, and returning back the specified distance to again reengage the output element 350 once again, and repeat the process. The travel path or circuit of each gear block 362 is controlled by adjusting the length, width, height, and/or size of the respective gear block and/or rocker arm and/or by altering the pathways or grooves 336 formed in the cam element 330.

The rocker arm 399 is pivoted around a specific pivot point by the cam follower 394, which traverses the pathway 336 formed in the cam element 330. Additionally, the gear blocks 362 may also have a pathway tracker and/or pathway cam follower that follows a separate path along the axial cam 331 that also triggers an actuation point for the gear block(s) 362. In at least one embodiment, there is at least one pivot or actuation point for both the gear block(s) 362 and the rocker arm 399 that allows each to actuate or pivot separately from each other and while also moving in conjunction to create a specific pattern of movement for the gear block(s) 362. The movement of a gear block 362, in at least one example, is a cyclical, annular or closed loop movement that may have a generally rectangular, elliptical, circular, square, conical, oval, ovoid, truncated circular pattern, or any combination thereof, design specified pattern of movement.

With reference now to FIG. 5, a perspective view is depicted of the cam element 330, output element 350, along with the rocker arm 399, cam follower 394, and gear block 362. The axial cam 331 is also depicted; however, in this view, it is not easily seen. A central axis 306 can pass through the central aperture 332 at the center of the cam element 330, axial cam 331, and/or output element 350. In at least one embodiment of the present disclosure, the cam element 330 interacts with the rocker arm 399 along with the gear block 362 to rotate and cause a movement of the gear block 362 to have a cyclical, annular or closed loop movement having a generally rectangular, elliptical, circular, square, conical, oval, ovoid, truncated circular pattern, or any combination thereof, design specified pattern of movement based upon the pathways in the cam element 330 that may allow a cam follower 394 attached to the rocker arm 399 to traverse along the pathway 336 and generate movement of the gear block(s) 362.

Each of the cam followers 394 can each have a separate path or, in some embodiments, may have a single path that each follow at a different position simultaneously. The gear block(s) 362 can be pivotally connected to the rocker arm 399. Alternatively or in addition, a ring spring connecting all of the gear blocks 362 in a gear train may be used as a biasing mechanism in accordance with the present invention. In at least one embodiment of the present disclosure, the cam element will have a single pathway, however there may be multiple pathways formed in the cam element 330 that can be in the same plane where they are parallel paths, or pathways of different distances from the central axis 306, or the pathways can be in separate planes stacked in the direction of the central axis 306.

In at least one embodiment, the pathway 336 formed in cam element 330 allows for movement and rotation of the gear blocks 362 causing the interface surfaces of the gear blocks 362 to engage, interface and/or interact with the output element 350. Cam follower(s) 394 maintain contact with the surface of their respective pathways or grooves formed in the cam element 330. While the cam element 330 depicted in the Figures, appears to be a single disc or unit having at least one pathway or groove 336 formed in the planar surface 334 of the cam element 330, it is understood that the cam element 330 may also comprise a plurality of separate discs, each having a unique pathway formed in its planar surface (e.g., 334), which are mechanically coupled to one another to assemble a single cam assembly 330. In a preferred embodiment, the planar surface 334 of the cam assembly 330 is substantially perpendicular to the axis of rotation of the cam assembly 330. While the planar surface 334 depicted in FIG. 5 is shown as being on the side of the cam element 330 facing the axial cam 331, it should be understood that the planar surface, into which pathway(s) 336 is formed, may either face the axial cam 331 or face away from the axial cam 331.

For example, by varying the radius of the pathway or groove 336 on the cam element 330, the rocker arm 399 pivots about its pivot point to compensate and maintain contact between rocker arm 399 and the main body (not illustrated). This pivoting or moving of the rocker arm 399 about its pivot point induces movement in the pivotal connection with the gear block 362. Each rocker arm 399 acts independently of the other rocker arm(s) 399 due to the cam follower(s) 394 of each rocker arm 399 following and/or traversing the pathway 336 formed in the planar surface 334 of the cam element 330 at their respective distinct points.

As the cam followers 394 for the rocker arms 399 follow their respective pathway(s) 336, the rocker arm 399 can pivot at a specific point causing the gear block to pivot and/or rotate around a specific point. For example, the pivot point of the rocker arm 399 will trigger a left, right, in or out, or a rotational motion to the gear block 362. In general, the three-dimensional circuit may have a first portion 339A includes urging the gear block 362 to biasing the output element 350 and move or rotate the output element 350 a specified distance prior to releasing the biasing of the output element 350. Additionally, there may be an engagement and/or disengagement actuation that results in a second portion 339B of the three-dimensional circuit (i.e., collectively the first portion 339A and the second portion 339B create the three-dimensional circuit which will be referred to as 339). Associated together they allow for a cyclical, annular or closed-loop movement or circuit 339 of the gear block and the interfacing surface that has a generally rectangular, elliptical, circular, square, conical, oval, ovoid, truncated circular pattern, or any combination thereof, design specified pattern of movement. The cyclical, annular or closed-loop movement or circuit 339 of the gear block 362 can allow for a positive biasing of the output interface surface by the gear block interface surface that is translated into a forward rotation of the output element 350. Additionally, the gear block 362 can negatively bias the output element interface surface with the gear block interface surface in a manner that reduces the backlash or possible backlash of the output element and/or gear block. In at least one embodiment, there can also be a neutral biasing or position that allows the gear block 362 to not bias the output element 350 in a positive and/or negative manner, it may also in some example allow for the gear block 362 to release outwardly from the central axis.

With reference now to FIGS. 5, 6, 7, 8, 9, 10, 11, and 12, additional illustrations of the third embodiment of a gearbox mechanism 320 of the present invention are depicted. By varying the radius of the pathway or groove 336 on the cam element 330, rocker arm(s) 399 drive their respective gear block(s) 362 through a two-dimensional circuit in response to rotation of the cam element 330. In general, the two-dimensional circuit 339A includes urging the gear block 362 to biasing the output element 350 and move or rotate the output element 350 a specified distance prior to releasing the biasing of the output element 350. Additionally, there may be an engagement and/or disengagement actuation that allows for the addition of a second portion 339B to the two-dimensional circuit. When the gear block is disengaged from the output element 350, the gear block 362 can be rotated and pivoted in a manner to allow it to move the interface surface in a direction opposite of the rotational movement of the output element 350, allowing the gear block 362 to return back the same specified distance to again reengage the output element 350 once again and repeat the process. It is understood that the two-dimensional circuit 339 depicted in the drawings is not to scale and is exaggerated to illustrate the general principal of the invention. For example, the distance A-B would typically be much smaller than depicted. The travel path or circuit 339A of each gear block 362 is controlled by adjusting the size and configuration of the rocker arm(s) 399, gear block(s) 362, and/or altering the pathway or groove 336 formed in the cam element 330.

When adapted to a gearbox mechanism 320, a plurality of gear block assemblies 360 are configured about the central axis 306 that passes through the cam element 330. The cam element 330, in at least one version, may be coupled to a power source (not illustrated) by an output device (not illustrated). As the cam element 330 rotates, the cam follower(s) 394 of the respective rocker arms(s) 399 of each gear block assembly maintain contact with a particular pathway or groove 336 formed in the planar surface 334 of the cam element 330. In a preferred embodiment, the planar surface 334 of the cam assembly 330 is substantially perpendicular to the axis of rotation of the cam assembly 330. The variance of distance from the center of rotation to the different points along the pathway or groove 336 of the cam element 330 causes the rocker arm(s) 399, pivotally attached to a gear block(s) 362 to work in concert to move their respective gear block(s) 362 through a predetermined circuit of movement 339. This predetermined circuit of movement 339 of the gear block 362 can be precisely calibrated to meet specific engineering requirements. For example, the torque ratio and speed reduction may be regulated and controlled by adjusting the circuit of movement 339 of each gear block 362. An axial cam 331 rotates, in coordination with the cam element 330, and as they are rotated the pathway tracker 364 (see in particular FIGS. 7, 13 and 14) of the gear block 362 tracks along the axial pathway or groove 337. The axial pathway or groove 337 is formed in the circumferential surface 335 of the axial cam 331. The variance of height of the pathway towards or away from the lower section 333A of the axial cam 331, causes the gear block 362 to be engaged or disengaged from the interface surface 353 of the output element 350 with a linear movement (may also be called a second portion 339B of the three-dimensional circuit for the gear block 362). The movement of the gear block 362 may be created through two separate portions (339A/339B) that act in concert to generate a rotational (two dimensional movement in one plane (horizontal) a combination of left-right/in-out axial motions) movement and a linear movement in a vertical plane (up and down motions) that create the three dimensional circuit.

Numerous embodiments of gearbox mechanisms are possible using the gear block assembly of the present invention. All embodiments of gearbox mechanisms constructed in accordance with the present invention feature a plurality of gear block assemblies configured about the central axis 306 of the cam element 330 and may comprise either an odd or even number of gear block assemblies. At least two, and preferably three or more, gear block assemblies are required for a gearbox mechanism of the present invention. The movement of the gear block assemblies typically moves in a rotational series to one another.

However, in a preferred embodiment of the present invention wherein the plurality of gear block assemblies comprises four or more even-number gear block assemblies, the gear block assemblies configured on opposing sides of the cam element 330 engage and disengage in unison from the secondary or output element 350. For example, an embodiment of the gearbox mechanism 320 may feature four gear block assemblies 360. Similarly, another embodiment of the gearbox mechanism 320 may feature six gear block assemblies 360. This is accomplished by ensuring that the individual pathways or grooves formed in the planar surface of the cam element are in phase with one another along the planar surface of the cam element 330.

Figure 8:
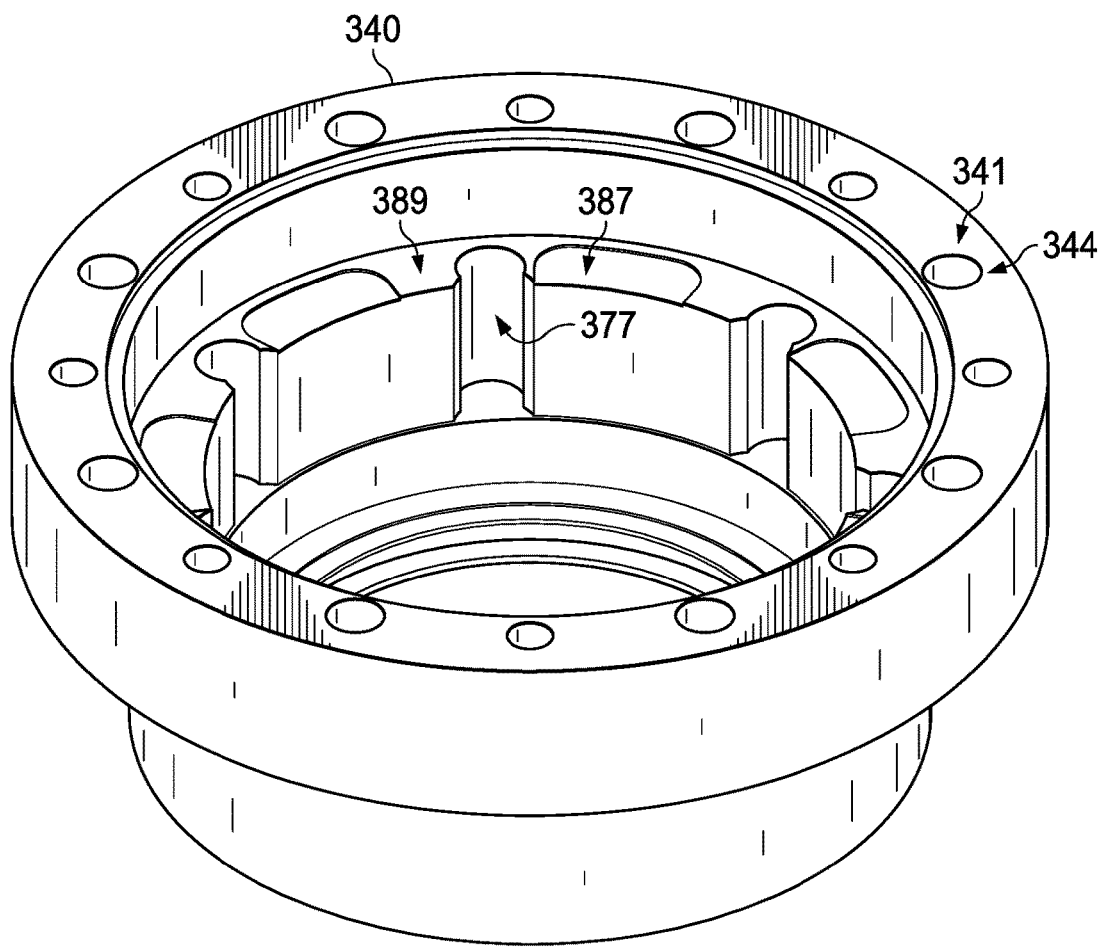
FIG. 8 is a perspective view illustration of a main body of the gearbox mechanism shown in FIG. 4.

With reference now to FIG. 8, a perspective view of a main body 340 is shown. The main body 340, in at least one version, can provide a housing for the gear block assemblies (not illustrated). The gear block assemblies (not illustrated) can rest and/or be supported by the main body retaining surface 387. The rocker arm(s) (not illustrated) may be supported and/or retained by the main body rocker arm void 377 as defined by the main body 340. A rocker arm post 388 (see e.g., FIG. 15) can be configured to be retained and/or supported by the main body rocker arm void 377 to allow for a pivoting motion of the rocker arm (see e.g., FIG. 15) to occur. For example, the main body rocker arm void 377 may be sized to retain and prevent the rocker arm(s) (not illustrated) from being removed except in a single direction that is perpendicular to the pivoting motion that the rocker arm(s), while the pivoting motion of the rocker arm(s) (not illustrated) can also coincide with a pivoting motion of the gear block (not illustrated) that allows for the interfacing, engaging, and/or rotating of an output element (not illustrated).

A cam interface surface 389 can support a cam element (not illustrated) as it engages with the gear assemblies (not illustrated). The main body 340 can be coupled on the cam side 341 to an input hub, a retainer, or other securing devices via a fastener (not illustrated) sized to fit into a coupling aperture 344 defined by the main body 340. The input hub, retainer, or other securing devices, in at least one example, can be utilized to secure and/or support a cam element (not illustrated) in a manner to prevent vibration but allow free movement of the cam element.

Figure 9:
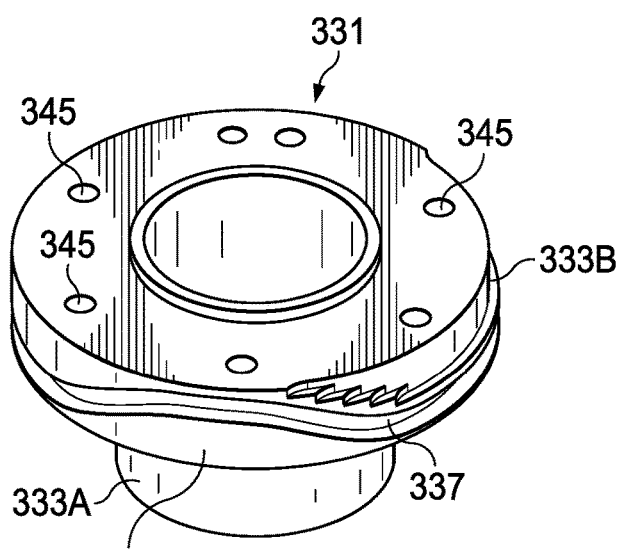
FIG. 9 is a perspective view illustration of an axial cam of the gearbox mechanism shown in FIG. 4.
Figure 10:
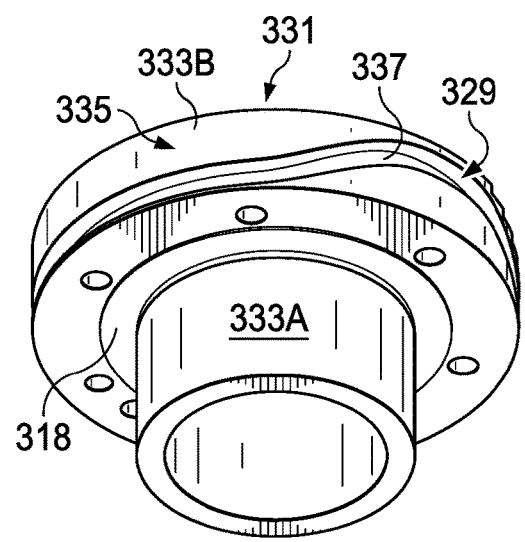
FIG. 10 is an alternative perspective view of the axial cam thereof.

With reference now to FIGS. 4, 9 and 10, assorted view of the axial cam 331 are depicted. The axial cam 331 can be coupled to a cam element 330 through an axial cam securing aperture 345. In at least one example, the axial cam securing aperture 345 can be a threaded aperture that allows for a fastener 302 to be utilized in securing the axial cam 331 and the cam element 330 in a secure and/or fixed manner. The axial cam 331 may comprise a lower section 333A and an upper section 333B. The lower section 333A can be a tubular section having a smooth surface for interfacing with the output element (not illustrated) and/or bearings, roller bearing, or ball bearings. The upper section 333B can comprise a flange section have one or more axial cam securing aperture(s) 345 traversing the portion of the upper section 333B that extends outwardly past the perimeter of the lower section 333A. The circumferential surface 335 of the upper section 333B may have a pathway 337 formed into it and defined by the upper section 333B of the axial cam 331. As depicted in FIG. 9, the axial cam pathway 337 is generally circular or annular, in a horizontal plane, while in other embodiments it will be shaped and/or configured to match the perimeter of the upper section 333B. In a transverse plane, the axial pathway 337 is generally straight or flat with at least one inflection point and/or hump 329 formed therein. The inflection point 329 and/or hump allows for an actuation or linear actuation of a gear block (not illustrated). The inflection point 329 and/or hump can also when combined with the two dimensional rotational movement (also call a first portion of the three-dimensional circuit) of the gear block (not illustrated) caused by the pivoting and/or rotation of the rocker arm(s) by the cam pathway, generate the second portion of movement, which when combined with the first portion creates a three dimensional circuit of movement for the gear block. The linear actuation of the gear block can allow for an engagement and disengagement of the gear block (not illustrated) from the output element (not illustrated).

Figure 11:
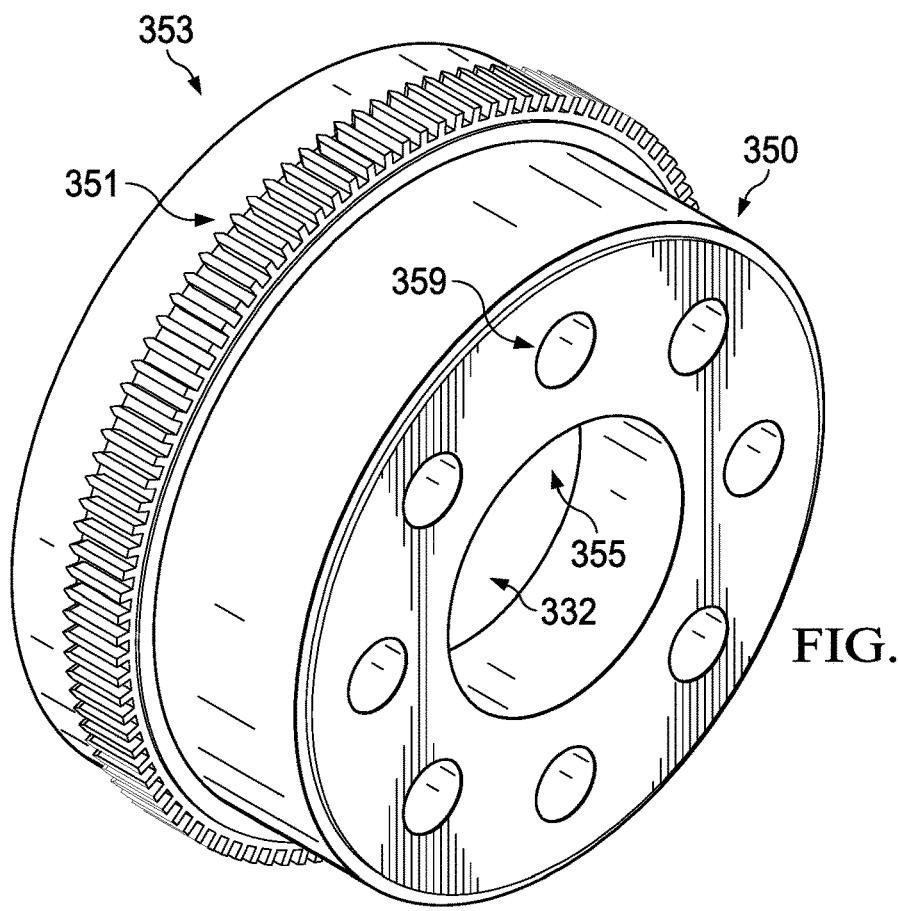
FIG. 11 is an illustration in perspective view of an output element of the gearbox mechanism shown in FIG. 4.

In FIG. 11, the output element 350 is illustrated in a perspective view. The output element 350 can have an output element circumferential surface 351. In at least one embodiment, the output element circumferential surface 351 can have an interface surface 353. In at least one example, the interface surface 353 can be a set of gear teeth, while in other examples the interface surface 353 may include post and hole, tongue and groove, friction fit surface or other interfacing means. The output element 350 may also be secured to an output device or system through a securing aperture 359.

The output element 350 has a central aperture 332 coaxially aligned with the center of the output element 350. The output element 350 may also define a housing void 355 that allows for the output element 350 to receive the axial cam (not illustrated) and the cam element (not illustrated).

Figure 12:
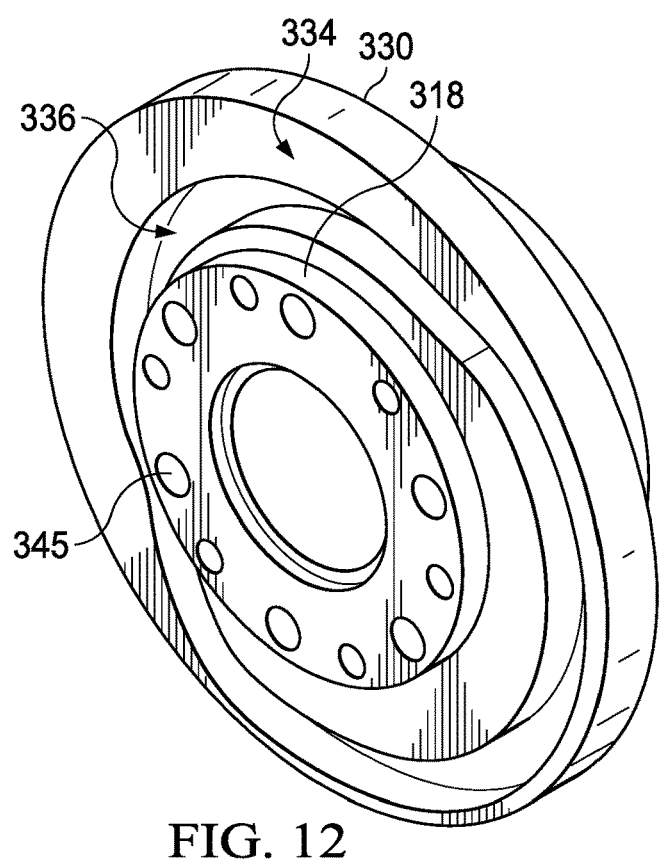
FIG. 12 is a perspective view illustration of a cam element of the gearbox mechanism shown in FIG. 4.

With reference now to FIG. 12, a perspective view of a cam element 330 is depicted. The cam element 330 can have one or more axial cam securing apertures 345 that allows for a securing of the cam element 330 with an output element guide and/or ball bearing assembly (or set of ball bearings) (not illustrated). The axial cam securing aperture(s) 345 can be arranged coaxially around the central aperture 332. The cam element 330 includes a planar surface 334 having at least one pathway 336 formed therein. In at least one example, the pathway 336 will have a single depth that is uniform along the entire pathway 336. In a preferred embodiment, the planar surface 334 of the cam assembly 330 is substantially perpendicular to the axis of rotation of the cam assembly 330. While the planar surface 334 in FIG. 12 is depicted on the side of the cam element 330 facing the axial cam 331, it should be understood that the planar surface into which pathway(s) 336 is formed may be configured on either facing side of the cam element 330 (i.e., either a planar surface facing the axial cam 331 or a planar surface facing away from the axial cam 331). In other examples, the pathway 336 may vary in depth along the length of the pathway 336. The pathway 336 can allow a cam follower 394 (See FIGS. 5 and 15) to generate a pivot or pivoting force on a rocker arm and/or gear block 362 (see FIG. 5). As the cam follower traverses the pathway 336 the pathway can change in direction to move a rocker arm and/or gear block coupled to the cam follower. The axial cam 331 (see FIGS. 9 and 10) can rest and/or be secured via one or more fasteners to the cam element support surface 318.

Figure 13:
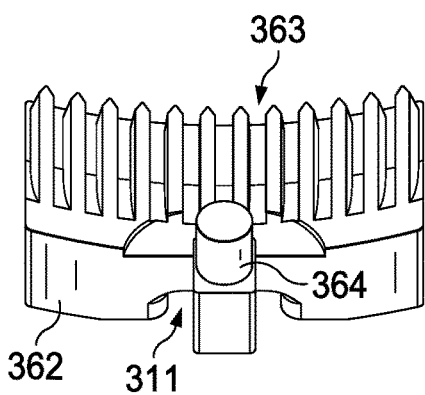
FIG. 13 is a front perspective view of a gear block of the gearbox mechanism shown in FIG. 4.
Figure 14:
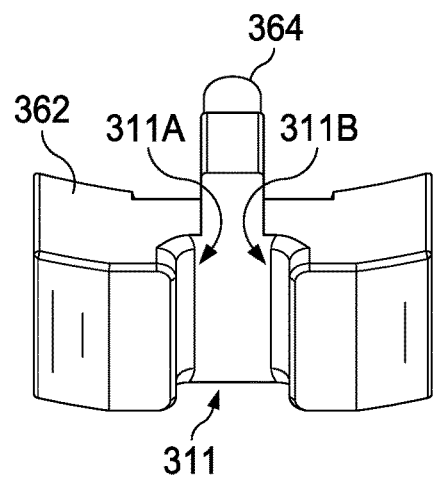
FIG. 14 is a rear perspective view of the gear block thereof.

FIGS. 13 and 14, illustrate an embodiment of a gear block 362. In this embodiment, the gear block 362 is generally rectangular in shape and includes a gear block tracking post 364. The gear block tracking post 364 can allow the gear block 362 to track a pathway 337 formed in the axial cam 331 (see FIGS. 9-10). The gear block 362 may further include an interface surface 363 for interfacing with the interface surface 353 of the output element 350 (see FIG. 11). In at least one example, the interface surface 363 comprises a set of gear teeth, while in other examples the interface surface 363 may include post and hole, tongue and groove, friction fit surface or other interfacing means. The gear block 362 further includes a void 311 formed in the opposing surface from the gear block interface surface 363. The gear block rotation void 311 is utilized to connect the gear block 362 to a rocker arm 399 (see FIGS. 6 and 15). In at least one example, the gear block rotation void 311, can have shoulders or contact points 311A/311B. The shoulder(s) or contact points 311A/311B can interact with receiving voids 397 on the rocker arm 399 to allow for pivoting and/or rotation to occur. In some examples, the shoulders or contact point(s) 311A/311B and the receiving voids 397 of the rocker arm 399 do not allow for the gear block 362 to rotate and/or pivot about a pivot point of the rocker arm 399.

Figure 15:
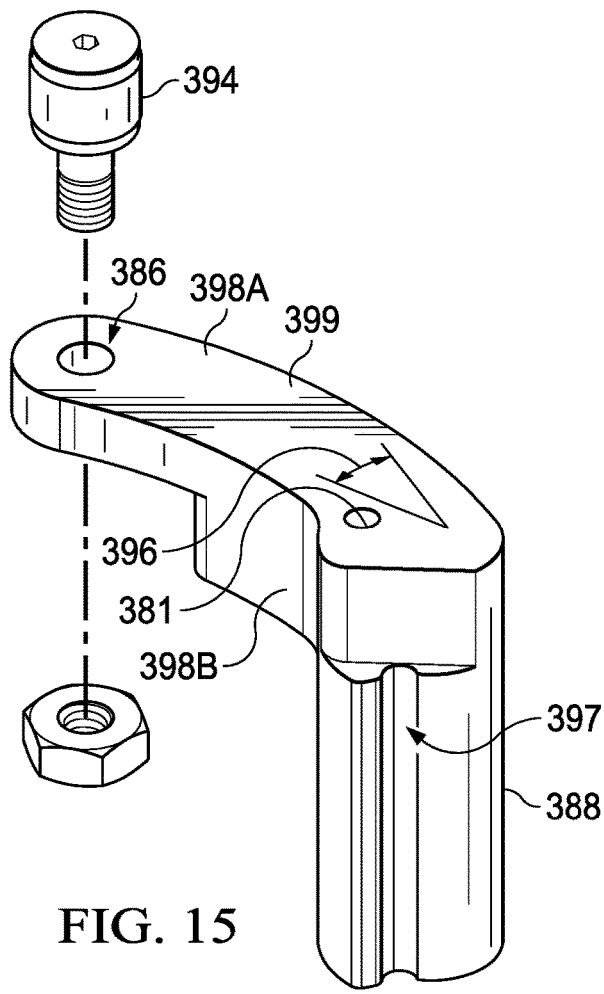
FIG. 15 is a top perspective view of a rocker arm of the gearbox mechanism shown in FIG. 4.
Figure 16:
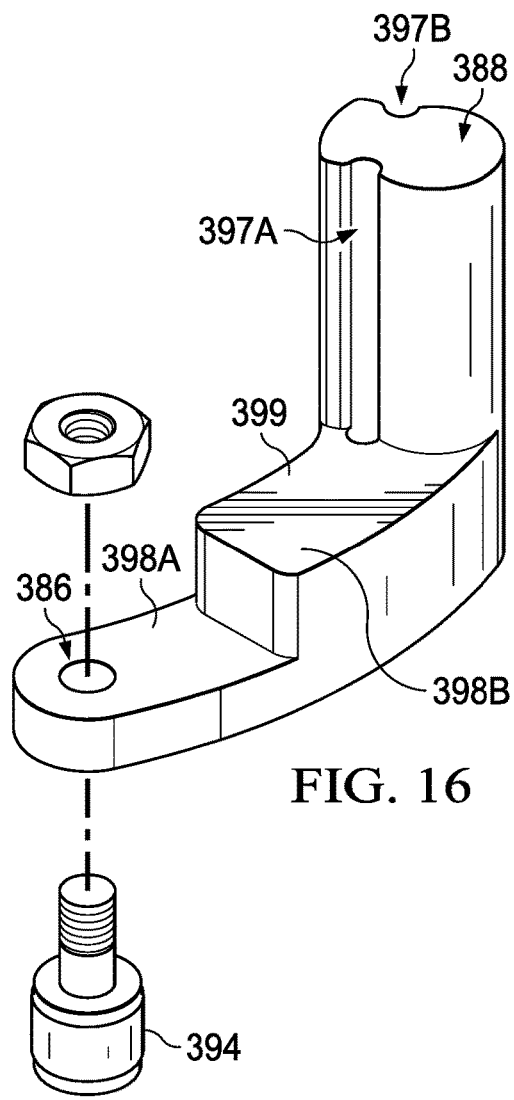
FIG. 16 is a bottom perspective view of the rocker arm thereof.

FIGS. 15 and 16 are illustrations of one embodiment of a rocker arm 399. The rocker arm 399 can be coupled to the gear block 362 (see FIG. 5) to generate a pivoting and/or rotational movement of the gear block 362. The rocker arm 399 is generally L-shaped, with an upper arm 398A, a rotation arm 398B, and a rocker arm post or pivot point 388. The upper arm 398A may have a cam follower aperture 386 formed through the upper arm portion 398A for receiving a cam follower device 394. The upper arm 398A and/or rotation arm 398B can be manufactured with an angled offset 396 that allows for the gear block (not illustrated) to be rotated and/or pivoted in a designer specified pattern. In some examples, the upper arm 398A and the rotational arm 398B, may have no offset angle 396 and create an approximate right or ninety degree angle with the pivot point portion 388 of the rocker arm 399. The rotational arm portion 398B of the rocker arm 399 may have a pivot pin aperture 381 that traverses the rotational arm portion and aligns with one of the receiving voids 397A and/or 397B that are defined by the rocker arm post/pivot point 388. As shown in FIG. 5, the rocker arm post/pivot point 388 can be configured to allow a gear block 362 to be coupled to the rocker arm 399. The rocker arm post/pivot point 388 can further include or define at least one receiving void 397. In some examples, there may be two receiving voids 397A, and/or 397B. The receiving void 397 can allow the rocker arm 399 to receive a shoulder or contact point of a gear block (not illustrated). In at least one embodiment, the receiving void(s) 397 can allow for the gear block 362 to be pivoted and/or rotated around a designer specified point in combination with other components of a gear block mechanism. The pivot pin aperture 381 allows for a pivot pin to be placed in a manner that would prevent a gear block from pivoting and/or rotating a specified amount by preventing the shoulder or contact point from being able to be received by the receiving void 397. This allows the gear block to generate a driving force in a single direction, and/or prevent the gear block from rotating beyond a specified rotation amount.

Figure 17:
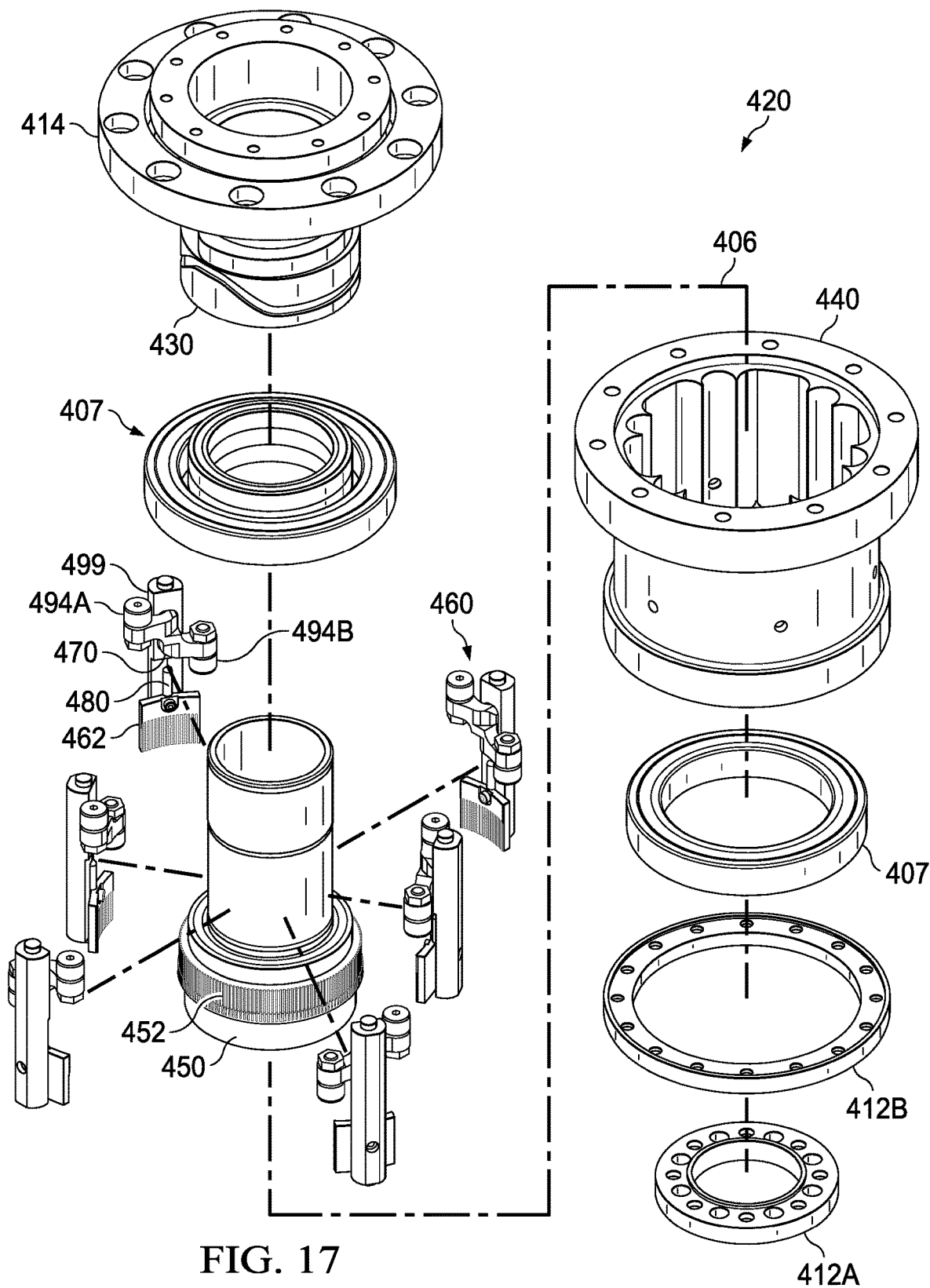
FIG. 17 is an illustration of an exploded perspective view of a fourth embodiment of a gearbox mechanism of the present invention.

With reference again to the Figures, and in particular FIG. 17, a fourth embodiment of a gearbox mechanism 420 of the present invention is depicted. The gearbox mechanism 420 may be powered and/or rotated by a power source or actuator (as shown in FIGS. 1A and 1B), that is translated to an output device. The power source can be an electric motor, combustion engine, water activated source, wind turbine, or other possible embodiments. Additionally, the power source or actuator, as well as the output device may be rotatively coupled by means of gears, chains, belts, or magnetic fields.

The gearbox mechanism 420 can be configured about a central axis 406. The central axis 406 can pass through a central aperture of the main body 440, the output element 450, cam element 430, and hub 414. The hub 414 may include a ball bearing assembly (not illustrated) that allows the cam element 430 to rotate freely within the hub 414 based upon an input device such as a shaft or rotatable elements such as a set of other gearing, belts, levers, magnetic or electrical fields, etc. The main body 440 and the hub 414 may be coupled together with fasteners (not illustrated). The fasteners may be screws, bolts, all thread, compression fit devices, or other means for fastening two components together in a fixed or secure manner. The gearbox mechanism 420 may further include bearings such as roller bearings 407 that may separate each of the output element 450, and cam element 430 from the main body 440 and/or the hub 414. The gearbox mechanism 420 may also include a plurality of gear block assemblies 460. Each gear block assembly can include a rocker arm 499 (rocker arms 499A, 499B, 499C, 499D, 499E, 499F, and 499G collectively referred to as rocker arm(s) 499) that are coupled with the gear block(s) 462 (gear blocks 462A, 462B, 462C, 462D, 462E, and 462F may be referred to collectively as gear block(s) 462). In some embodiments the gear block(s) 462 may have a pathway tracker that can individually or in combination with a pathway follower element tracks and/or follows a pathway formed into the cam element 430.

The gear blocks 462 of the present invention are specifically designed to enable a greater surface area (e.g., greater number of gear teeth) to engage the output element 450 at any given time, thereby spreading the stresses associated therein across a greater area. By dramatically increasing the contact area between the gear block 462 and the output element 450 at any given time the mechanical stress level is significantly decreased. In addition, the gear block 462 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 462 against the output element 450 are distributed across a greater area, the gear block 462 may be manufactured of lighter-weight materials, which are typically less expensive and easier to manufacture, with no degradation in reliability.

For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism 420 of the present invention is adaptable to a broad range of applications that were previously impractical because of weight and space limitations.

Figure 23:
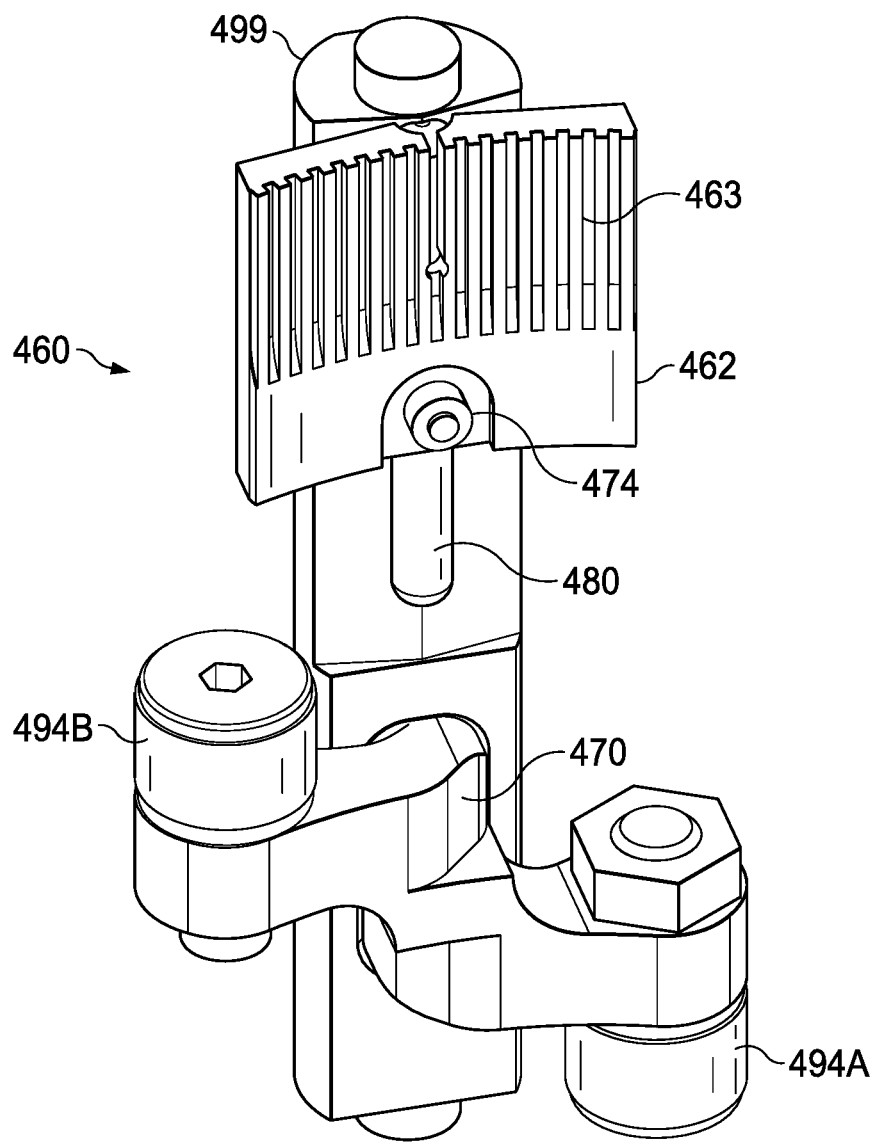
FIG. 23 is a perspective view illustration of a gear block assembly of the gearbox mechanism shown in FIG. 17.

In some embodiments, the rocker arm 499 can also have a cam follower 494 allowing for the following of a specified pathway(s) formed along a circumferential surface of the cam element 430. The interface surfaces 463 (see FIG. 23) of the gear block 462 can engage with the interface surface 452 of the output element 450. In some embodiments, the gear blocks are rotated by an associated movement of the rocker arm 499.

The cam element 430 includes at least one unique pathway or groove that interfaces with the cam follower 494 of the rocker arm 499 so that, as the cam element 430 rotates, the movement of the gear block 462 and/or rocker arm 499 is controlled in two dimensions in accordance with at least one certain design parameter. By varying the radius of the pathway or grooves on the cam element 430, the gear block assemblies drive respective gear block(s) 462 through a two-dimensional circuit in response to rotation of the cam element 430. Broadly speaking, the two-dimensional circuit includes urging the gear block(s) 462 to engage the output element 450 and move and/or rotate the output element 450 a specified distance prior to disengaging from the output element 450, and returning back the specified distance to again reengage the output element 450 once again, and repeat the process. The travel path or circuit of each gear block 462 is controlled by adjusting the length, width, height, and/or size of the respective gear block and/or rocker arm 499 and/or altering the pathways or grooves formed in the cam element 430.

Figure 18:
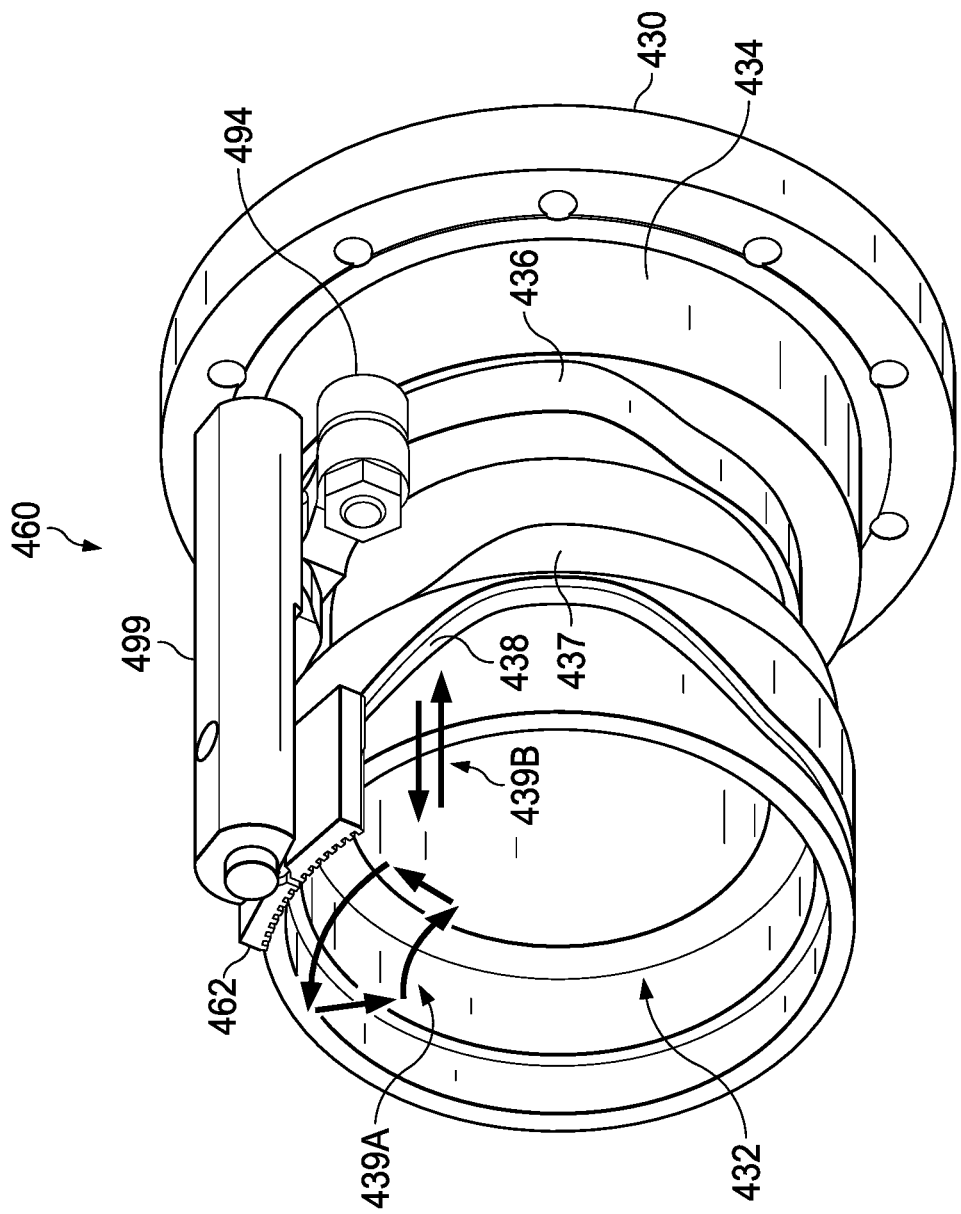
FIG. 18 is a perspective view illustration of a cam element and gear block assembly of the gearbox mechanism shown in FIG. 17.

The rocker arm 499 is pivoted around a specific pivot point by the cam follower 494, which traverses the path in the cam element 430 as the cam element 430 rotates. Additionally, the gear blocks 462 may also have a pathway tracker and/or pathway cam follower that follows a separate path along the cam element 430 that also triggers an actuation point for the gear block(s) 462. In at least one embodiment, there is at least one pivot or actuation point for both the gear block(s) 462 and the rocker arm 499 that allows each to actuate or pivot separately from each other and while also moving in conjunction to create a specific pattern of movement for the gear block(s) 462. The movement of a gear block 462, in at least one example, is a cyclical, annular or closed loop movement that may have a generally rectangular, elliptical, circular, square, conical, oval, ovoid, truncated circular pattern, or any combination thereof, design specified pattern of movement. In some embodiments, the main body 440 may be coupled with at least one hub 412A and/or 412B. In some examples, the hub(s) 412A and 412B may be coordinated With reference now to FIG. 18, a perspective view is depicted of the cam element 430, along with the rocker arm 499, cam followers 494, and gear block 462. The central axis 406 passes through the central aperture 432 at the center of the cam element 430. In at least one embodiment of the present disclosure, as it rotates the cam element 430 interacts with the rocker arm 499 along with the gear block 462 to cause the gear block 462 to have a cyclical, annular or closed loop movement having a generally rectangular, elliptical, circular, square, conical, oval, ovoid, truncated circular pattern, or any combination thereof, design specified pattern of movement based upon the pathways in the cam element 430 that may allow a cam follower 494 attached to the rocker arm 499 to traverse along the pathway and generate movement of the gear block(s) 462. In at least one embodiment, the cam follower(s) 494 may be coupled and/or attached to the rocker arm 499 through a rocker block 470 (see FIGS. 23 & 28).

Each of the cam followers 494 can each have a separate path or, in some embodiments, may have a single path that each follow at a different position simultaneously. The gear block(s) 462 can be pivotally connected to the rocker arm 499. Alternatively, or in addition, a ring spring connecting all of the gear blocks 462 in a gear train may be used as a biasing mechanism in accordance with the present invention. In at least one embodiment of the present disclosure, the cam element will have a single pathway, however there may be multiple paths formed in the cam element 430 that can be in the same plane where they are parallel paths, or paths of different distances from the central axis 406, or the paths can be in separate planes stacked in the direction of the central axis 406.

In at least one embodiment, the pathways 436, 437 along cam element 430 allows for movement and rotation of the gear blocks 462 causing the interface surfaces of the gear blocks 462 to engage, interface and/or interact with the output element 450 (FIG. 17). As the cam element 430 rotates, cam follower(s) 494 maintain contact with the surface of their respective pathways or grooves formed in the cam element 430. While the cam element 430 depicted in the Figures, appears to be a single unit having at least one pathway or groove formed in the circumferential surface 434 of the cam element 430, it is understood that the cam element 430 may also comprise a plurality of separate discs or tubes, each having a unique pathway formed in its circumferential surface 434, which are mechanically coupled to one another to assemble a single cam assembly 430.

For example, by varying the radius of the pathway or groove 436, 437 on the cam element 430, the rocker arm 499 pivots about its pivot point to compensate and maintain contact between rocker arm 499/cam follower 494 and the pathway 436, 437. This pivoting or moving of the rocker arm 499 about its pivot point induces movement in the pivotal connection with the gear block 462. Each rocker arm 499 acts independently of the other rocker arm(s) 499 due to the cam follower(s) 494 of each rocker arm 499 following and/or traversing the pathway 436, 437 formed in the circumferential surface of the cam element 430 at their respective distinct points.

As the cam followers 494 for the rocker arms 499 follow their respective pathway(s) 436, 437 the rocker arm 499 can pivot at specific point causing the gear block to pivot and/or rotate around a specific point. For example, the pivot point of the rocker will trigger a left, right, in or out, or a rotational motion to the gear block 462. Associated together they allow for a cyclical, annular or closed-loop movement of the gear block and the interfacing surface that has a generally rectangular, elliptical, circular, square, conical, oval, ovoid, truncated circular pattern, or any combination thereof, design specified pattern of movement. For example, the pivot point of the rocker arm 499 will trigger a left, right, in or out, or a rotational motion to the gear block 462. In general, the two-dimensional circuit may have a first portion 439A includes urging the gear block 462 to biasing the output element (not illustrated) and move or rotate the output element (not illustrated) a specified distance prior to releasing the biasing of the output element. Additionally, there may be an engagement and/or disengagement actuation that allows for a second portion 439B of the two-dimensional circuit 439. Associated together they allow for a cyclical, annular or closed-loop movement or circuit 439 of the gear block and the interfacing surface that has a generally rectangular, elliptical, circular, square, conical, oval, ovoid, truncated circular pattern, or any combination thereof, design specified pattern of movement. The cyclical, annular or closed-loop movement or circuit 439 of the gear block 462 can allow for a positive biasing of the output interface surface by the gear block interface surface that is translated into a forward rotation of the output element 350. Additionally, the gear block 462 can negatively bias the output element interface surface with the gear block interface surface in a manner that reduces the backlash or possible backlash of the output element and/or gear block. In at least one embodiment, there can also be a neutral biasing or position that allows the gear block 462 to not bias the output element in a positive and/or negative manner, it may also in some example allow for the gear block 462 to release outwardly from the central axis.

Figure 19:
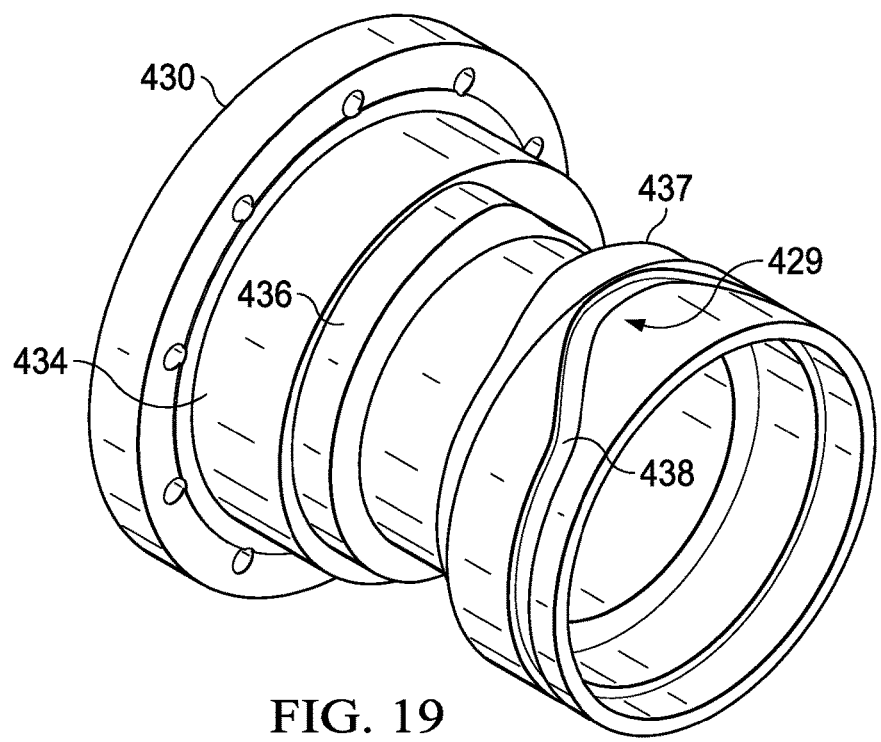
FIG. 19 is an illustration of a perspective view of the cam element thereof.
Figure 20:
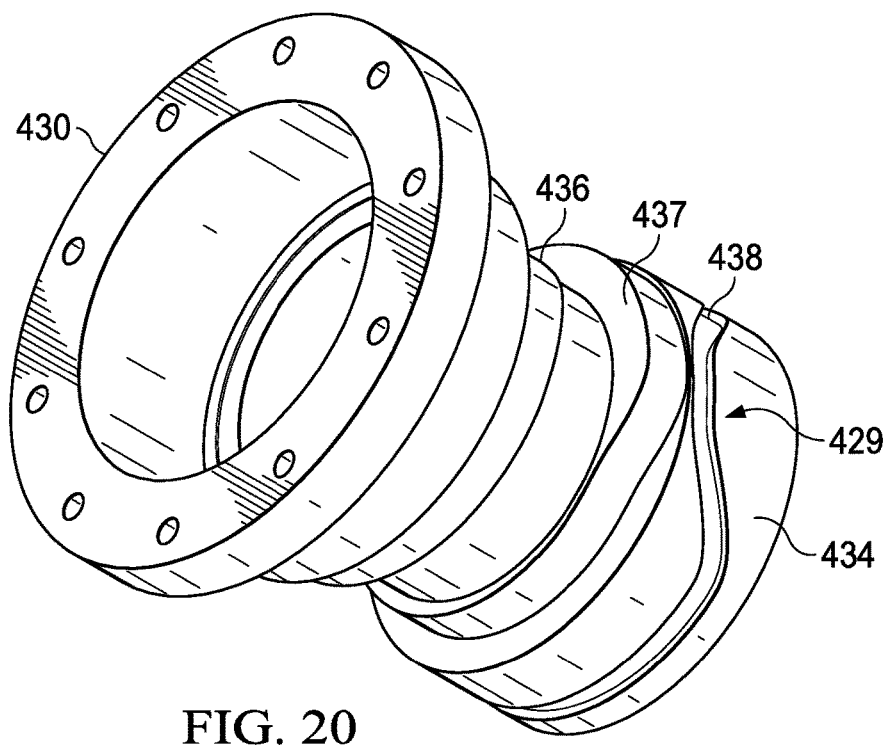
FIG. 20 is an illustration of an alternative perspective view of the cam element thereof.
Figure 22:
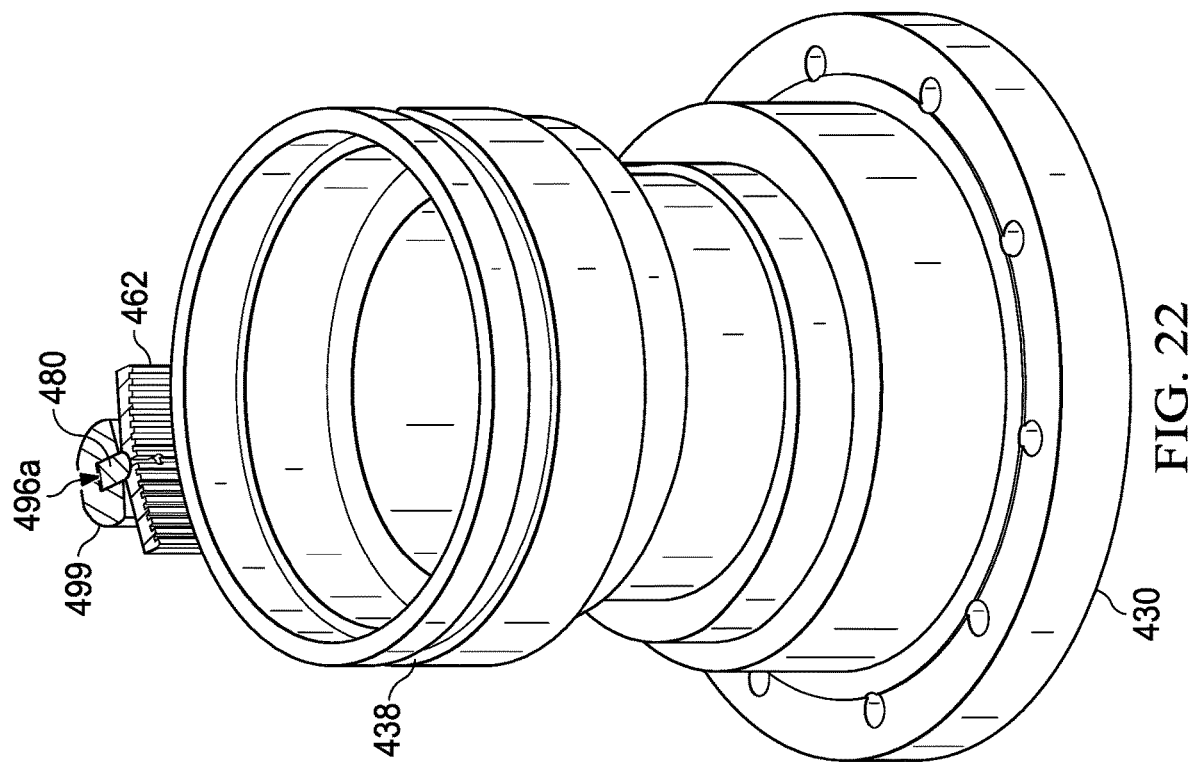
FIG. 22 is another sectional view illustration of the cam element and gear block assembly of the gearbox mechanism shown in FIG. 17.
Figure 24:
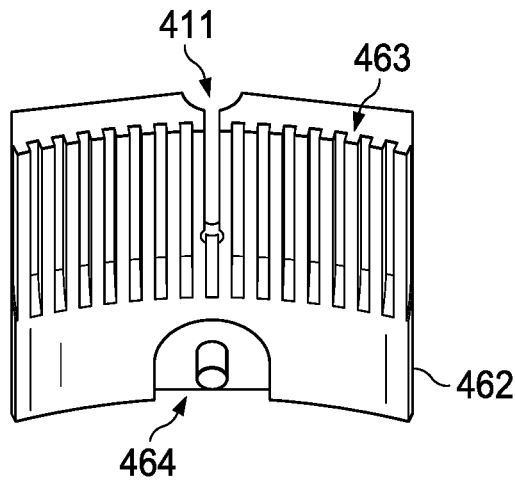
FIG. 24 is a front perspective view of a gear block of the gear block assembly shown in FIG. 23.
Figure 25:
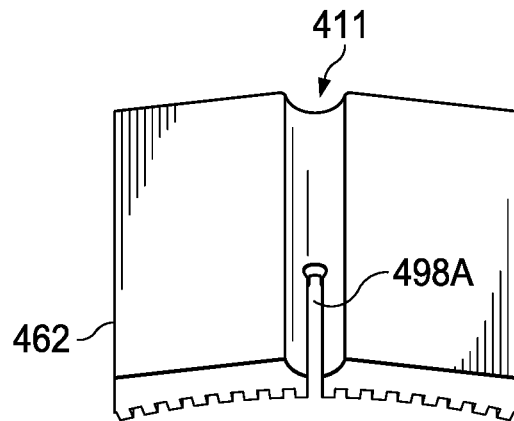
FIG. 25 is a rear perspective view of the gear block thereof.

FIGS. 19-20 provide illustrations of the cam element in alternative perspective views. The cam pathways 436/437 allow for a biasing of the gear block (not illustrated) in both positive and negative directions. For example, as a cam follower (not illustrated) follows the pathways formed along the circumferential surface 434 of the cam element the gear block is rotated and/or pivoted into and/or through a neutral position, a positively biased position, or a negatively biased position. In this example, radiuses of the pathways 436/437 allow for the gear block (not illustrated) to be cycled through a neutral position at a first point along the interface surface of the output element (not illustrated) to a neutral position at a second point along the interface surface of the output element. The neutral positions allow for an engagement and/or disengagement to occur and allow for the gear block to be cycled from a first engaged position to a second engaged position. The cam element 430 may also have an actuation pathway 438 that may be tracked and/or followed by a gear block tracking post 464 (see FIG. 24) and/or a gear block tracking follower 474 (see FIG. 23). The actuation pathway 438 allows the linearly actuated based on the position of the gear block tracker post 464 (see FIG. 24) along the actuation pathway 438. The linear actuation in combination with the rotational actuation (two-dimensional actuation) of the gear block results in a three-dimensional actuation. The three-dimensional combination of movements causes the cyclical and/or patterned movement of gear block that imparts a force on the output element (not illustrated) generating movement of said output element. As shown in FIGS. 20 and 22, in the transverse plane, the actuation pathway 438 is generally straight or flat with at least one inflection point and/or hump 429 formed therein. The inflection point 429 and/or hump allows for an actuation or linear actuation of a gear block (not illustrated). The inflection point 429 and/or hump can also allow for, when combined with the two-dimensional circuit of the gear block (not illustrated) caused the pivoting and/or rotation of the rocker arm(s) by the cam pathway, causes a three-dimensional circuit for the gear block. The linear actuation of the gear block can allow for an engagement and disengagement of the gear block from the output element.

With reference now to FIGS. 21-29, various perspective and isometric view illustrations of a gear block assembly 460 and/or portions of a gear block assembly are depicted. The gear block assembly 460 may include a rocker block 470, a rocker pin 480, gear block 462, tracker follower 474, rocker arm 499, and cam follower(s) 494A/494B. The rocker arm 499 is configured to allow the gear block 462 to be engaged and/or disengaged with an output element (not illustrated) as the tracker follower 474 follows an actuation pathway (not illustrated) the engagement/disengagement of the gear block 462 may be caused linear or actuation movement of the gear block 462. Additionally, the cam follower(s) 494A/494B can follow pathways that cause a two-dimensional movement of the gear block 462.

In at least one embodiment, the rocker arm 499, defines a rocker block void 497B within the rocker arm 499. The rocker block void 497B can be sized and shaped to allow it to receive a portion of the rocker block 470. The rocker block 470 may have a rocker block extension 474 that allows for the cam follower arm(s) 472A/472B to be coupled to the rocker arm 499. The cam follower arm(s) 472A/472B can have a cam follower aperture 471A/471B that is defined in the cam follower arm(s) 472A/472B and traverses through the body of each respective cam follower arm 472A/472B. The rocker block 470 in at least one embodiment is manufactured of a resilient material that does not allow for any flexing of the cam follower arm(s) 472A/472B. In at least one example, the cam follower arm(s) 472A/472B may be made of a flexible material that may have memory properties that prevent it from overextending and/or returning to a specific structure or form after a flexing has occurred.

The rocker arm 499 can also define a rocker pin void 497A within the rocker arm 499. The rocker pin void 497A may also include a rocker securing pin void 498B that is sized to receive a fastener (not illustrated). The fastener (not illustrated) may be utilized to prevent the rocker pin 480 from moving once placed within the rocker pin void 497A. In some embodiments, the fastener (not illustrated) may also couple the rocker pin 480 with the gear block 462. The gear block 462 can have a pin slot 498A that allows for a fastener, or other coupling device, mechanism or means to couple the gear block to the rocker arm 499 and/or the rocker pin 480.

The gear block 462 can include a gear block rotation void 411 that allows for a coupling device or mechanism to interface with the pin slot 498A. Additionally, the gear block rotation void 411 can also allow for the rotation and/or pivoting of the gear block 462 based on the actuation, rotation, and/or pivoting imposed on the rocker arm 499, rocker block 470 and/or rocker pin 480. As the gear block 462 is rotated and/or pivoted the gear block interface surface 463 can interact with other interface surfaces such as an output interface surface (not illustrated). The gear block 462 can have a gear block post 464 that allows the gear block 462 to interface with a pathway and/or groove. The gear block post 464 can also allow for a tracking element (not illustrated). The tracking element may be a ball bearing, roller bearing, or other mechanism or means for reducing friction.

Figure 21:
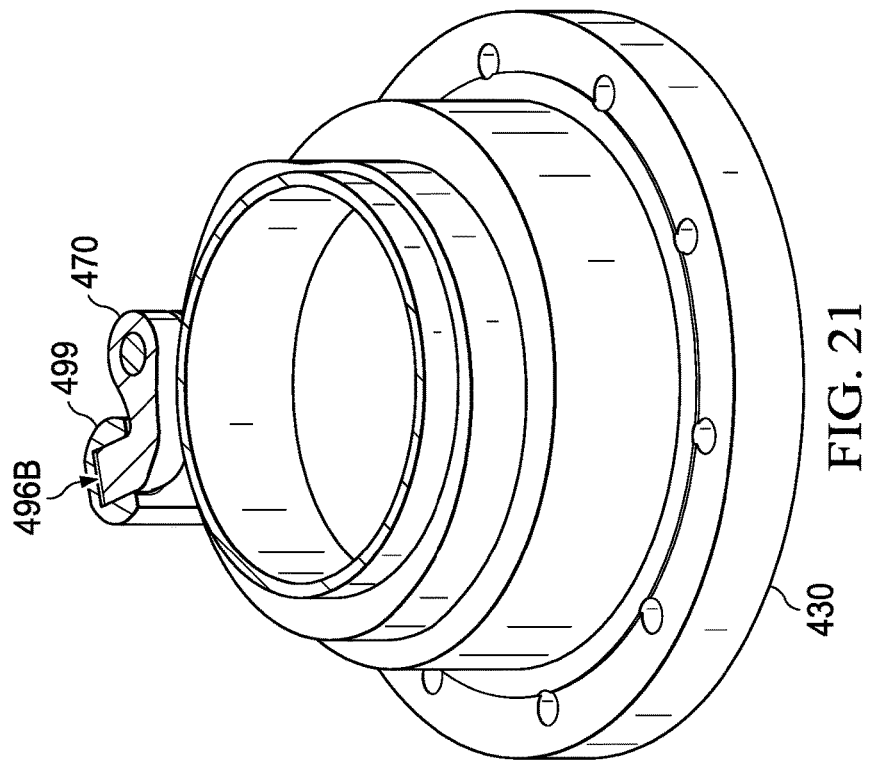
FIG. 21 is a sectional view illustration of the cam element and gear block assembly of the gearbox mechanism shown in FIG. 17.

With reference to FIGS. 21 and 22, when the rocker arm 499 is coupled with the rocker block 470 and/or rocker pin 480 there can be a gap or void 496A/496B that can be filed with a void or material to allow for compliance mechanics. The material in some embodiments may have a memory or alloy like effect that allow it to transfer energy between the rocker arm 499 and the rocker pin 480 or the rocker block 470. Compliance mechanics or compliance mechanisms allow for a force or energy to be transferred to another body or object through a deformation or elastic body.

Figure 30:
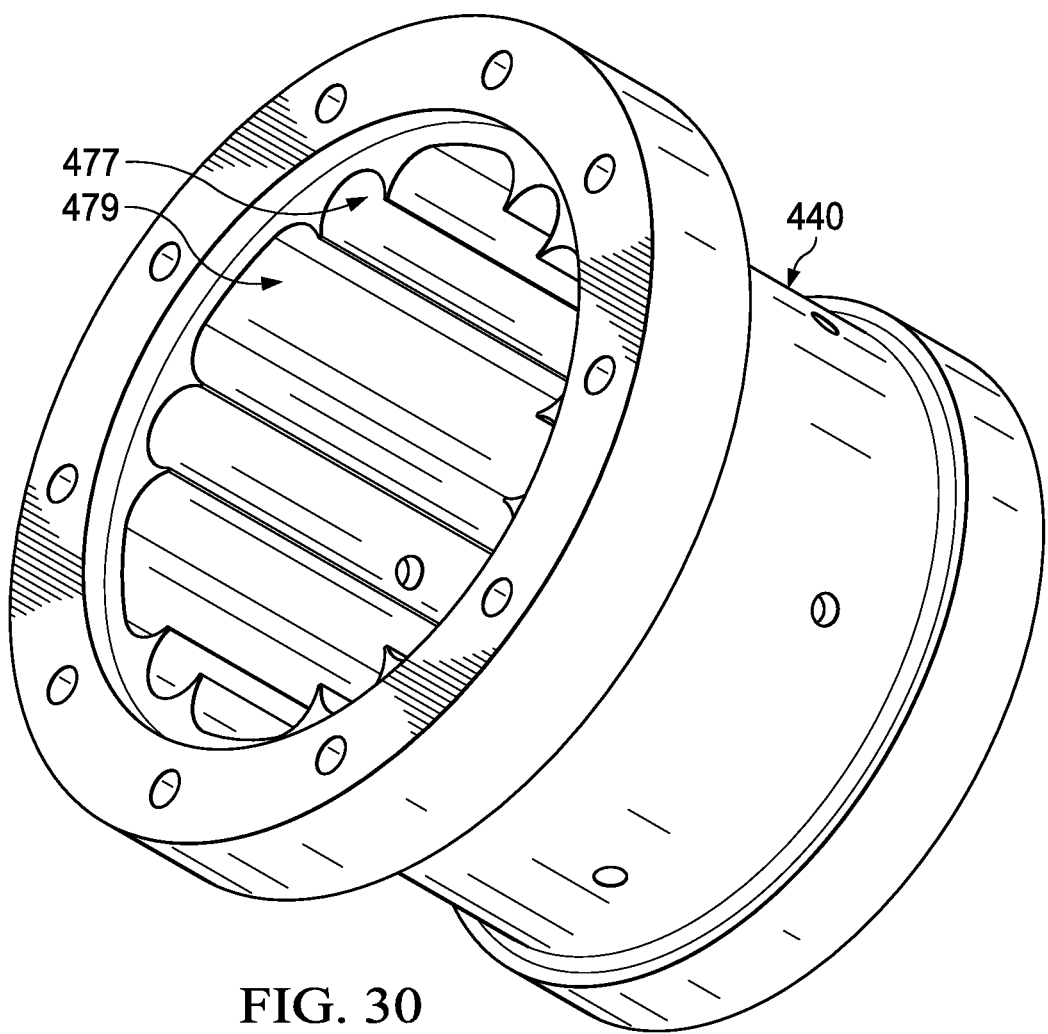
FIG. 30 is a perspective view of a main body of the gearbox mechanism shown in FIG. 17.

FIG. 30 is a perspective view of the main body 440. The main body 440, in at least one embodiment, houses the gear block assembly when the gear block mechanism is assembled. The main body 440 can have a rocker arm void 477 and a rotation or pivot void 479. The rocker arm void 477 allows for the main body 440 to receive the rocker arm 499 and allow it to pivot and/or rotate about a fixed pivot point. The rotation or pivot void 479 allows for the rotation and/or pivoting of the gear block assembly. In at least one example, the rotation or pivot void 479 allows for the gear block assembly, and/or the rocker block (not illustrated) to rotate and/or pivot into the void with the wall of the void as defined by the main body 440, thereby preventing excessive rotation or pivoting.

It will now be evident to those skilled in the art that there has been described herein an improved gearbox mechanism. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A gearbox mechanism comprising:
   a cam element configured to have at least one pathway formed in a first portion of a circumferential surface of the cam element, and at least one actuation pathway formed in a second portion of the circumferential surface of the cam element; wherein the at least one pathway is formed in a radial direction perpendicular to a central axis and having a varying radius from the central axis;
   an output element configured to be engaged at an output element interface surface formed along an output element circumferential surface, and the output element is coaxially configured with the cam element;
   at least one gear block assembly comprising a gear block, a rocker arm, and at least one cam follower, wherein the gear block can engage the rocker arm via a rocker pin void defined by the rocker arm, and the at least one cam follower can engage with the rocker arm via a rocker block void defined by the rocker arm; and
   a main body sized and configured to receive the at least one gear block assembly and rotatably engage the rocker arm, and wherein the main body is coaxially configured with the output element and the cam element;

wherein the gear block further comprises a gear block interface surface configured to engage the output element interface surface, and causing rotation of the output element about the central axis based on rotation of the cam element.

2. The gearbox mechanism of claim 1, wherein the cam element further comprises two or more separate discs or tubes coupled together.

3. The gearbox mechanism of claim 2, wherein each of the two or more separate discs or tubes comprises one or more of the at least one pathway formed in the radial direction perpendicular to the central axis.

4. The gearbox mechanism of claim 1, wherein the at least one actuation pathway varies in a direction parallel to the central axis.

5. The gearbox mechanism of claim 4, wherein the at least one actuation pathway comprises at least one inflection point.

6. The gearbox mechanism of claim 1, wherein the gear block engages with the rocker arm through a rocker pin.

7. The gearbox mechanism of claim 1, wherein the at least one cam follower engages with the rocker arm through a rocker block.

8. The gearbox mechanism of claim 1, wherein the cam element and the output element engage through a set of roller bearings or a set of ball bearings.

9. The gearbox mechanism of claim 1, wherein the main body is removably coupled to a hub.

10. The gearbox mechanism of claim 9, wherein the cam element and the hub are engaged through a set of roller bearings or a set of ball bearings.

11. The gearbox mechanism of claim 1, wherein the gear block further comprises a pathway tracker.

12. The gearbox mechanism of claim 11, wherein the pathway tracker engages the at least one actuation pathway.

13. A cam-actuated gear block assembly comprising:
a gear block having a gear block interface surface;
at least one cam follower configured to follow a pathway having a varying radius; and
a rocker arm defining a rocker pin void for engaging the gear block, and defining a rocker block void configured to engage the at least one cam follower;
wherein the rocker arm interacts with the gear block and the at least one cam follower, and generates movement of the gear block based on a pivoting movement of the at least one cam follower.

14. The cam-actuated gear block assembly of claim 13, further comprising a rocker block that frictionally engages with the rocker block void.

15. The cam-actuated gear block assembly of claim 14, wherein the rocker block comprises at least one cam follower arm configured to receive the at least one cam follower.

16. The cam-actuated gear block assembly of claim 13, wherein the gear block further comprises tracker post configured to engage an actuation pathway.

17. The cam-actuated gear block assembly of claim 16, wherein the tracker post further comprises a tracker follower that rotatably engages with the tracker post.

18. The cam-actuated gear block assembly of claim 13, wherein the gear block is slidably coupled to a rocker pin.

19. The cam-actuated gear block assembly of claim 18, wherein the rocker pin is configured to pivotably engage with the rocker pin void of the rocker arm.

20. A gearbox mechanism comprising:
a cam assembly removably coupled to a rotating device, the cam assembly having at least one pathway with a varying radius in a direction perpendicular to a central axis, and at least one actuation pathway varying in a direction parallel to the central axis, each of the at least one pathway and at least one actuation pathway are formed into the circumferential surface of the cam assembly, and the cam assembly being rotatable around the central axis when rotated by the rotating device;
an output element coaxially configured with the cam assembly and removably coupled to an output device, wherein the output element has an output element interface surface on a circumferential surface of the output element; and
at least one cam-actuated gear block assembly comprising:
a gear block having a gear block interface surface configured to engage with an output element interface surface;
a rocker arm pivotally coupled to the gear block through a rocker pin that is slidably coupled to the gear block and configured to be pivoted by the rocker arm;
a pathway tracker coupled to the gear block configured to track the at least one actuation pathway of the cam assembly; and
a cam follower rotatably coupled to the rocker arm through a rocker block that allows for a rotatable connection of the cam follower, and the rocker block being friction fit to the rocker arm;
wherein the cam follower causes the rocker arm to pivot when following the at least one pathway, generating a two-dimensional motion of the gear block, and the pathway tracker is configured to follow the at least one actuation pathway resulting in a linear motion of the gear block.

* * * * *